United States Patent
Park

(10) Patent No.: US 11,360,898 B2
(45) Date of Patent: Jun. 14, 2022

(54) APPARATUS AND METHOD FOR IMPROVING INPUT/OUTPUT THROUGHPUT OF MEMORY SYSTEM

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 106 days.

(21) Appl. No.: 16/856,111

(22) Filed: Apr. 23, 2020

(65) Prior Publication Data
US 2021/0064532 A1    Mar. 4, 2021

(30) Foreign Application Priority Data
Sep. 2, 2019    (KR) .................. 10-2019-0108164

(51) Int. Cl.
| | |
|---|---|
| G06F 12/0846 | (2016.01) |
| G06F 12/0882 | (2016.01) |
| G06F 13/16 | (2006.01) |
| G06F 12/06 | (2006.01) |
| G06F 12/02 | (2006.01) |

(52) U.S. Cl.
CPC ...... *G06F 12/0851* (2013.01); *G06F 12/0246* (2013.01); *G06F 12/063* (2013.01); *G06F 12/0882* (2013.01); *G06F 13/1673* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 9,135,192 B2 * | 9/2015 | Lin | G06F 13/1642 |
| 9,229,854 B1 | 1/2016 | Kuzmin et al. | |
| 9,432,298 B1 | 8/2016 | Smith | |
| 2007/0005934 A1 * | 1/2007 | Rotithor | G06F 12/0862 |
| | | | 711/213 |
| 2013/0279251 A1 | 10/2013 | Lee | |
| 2017/0026441 A1 | 1/2017 | Moudy et al. | |
| 2019/0042409 A1 * | 2/2019 | Jereczek | G06F 13/1647 |

* cited by examiner

*Primary Examiner* — Yaima Rigol
(74) *Attorney, Agent, or Firm* — IP & T Group LLP

(57) ABSTRACT

This technology relates to a method and apparatus for improving I/O throughput through an interleaving operation for multiple memory dies of a memory system. A memory system may include: multiple memory dies suitable for outputting data of different sizes in response to a read request; and a controller in communication with the multiple memory dies through multiple channels, and suitable for: performing a correlation operation on the read request so that the multiple memory dies interleave and output target data corresponding to the read request through the multiple channels, determining a pending credit using a result of the correlation operation, and reading, from the multiple memory dies, the target data corresponding to the read request and additional data stored in a same storage unit as the target data, based on a type of the target data corresponding to the read request and the pending credit.

19 Claims, 14 Drawing Sheets

APPARATUS AND METHOD FOR IMPROVING INPUT/OUTPUT THROUGHPUT OF MEMORY SYSTEM

CROSS-REFERENCE TO RELATED APPLICATION

This application claims priority under 35 U.S.C. § 119 to Korean Patent Application No. 10-2019-0108164, filed on Sep. 2, 2019, which is incorporated herein by reference in its entirety.

BACKGROUND

1. Field

Various embodiments of the invention relate to a memory system, and more particularly, to a method and an apparatus for improving data input/output performance through an interleaving operation on memory dies in the memory system.

2. Discussion of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like increases. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device embodied as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

An embodiment of the disclosure may provide a memory system, a data processing system, and an operation process or a method, which may quickly and reliably process data into a memory device by reducing operational complexity and performance degradation of the memory system, thereby enhancing efficiency of the memory device.

In addition, an embodiment of the disclosure may provide a method and an apparatus for inputting and outputting plural pieces of data to and from a plurality of memory dies in a memory system in an interleaving format to improve data input/output performance (e.g., I/O throughput) of the memory system.

Further, an embodiment of the disclosure may provide a memory system which limitation not limited to a physical location in which a piece of data is to be stored for an interleaving operation, in a process of storing the piece of data in a plurality of memory dies, thereby effectively utilizing the plurality of memory dies in the memory system so that an operation stability and a lifespan of a memory system may be improved.

In addition, an embodiment of the disclosure may provide an apparatus and a method for dynamically determining whether to proceed or stop a correlation operation to plural requests based on a configuration of a memory system and/or characteristics of the correlation operation, which influences an operation such as reading or writing data performed in the memory system, so that overhead in operations performed in the memory system may be reduced.

Also, various embodiments are directed to the provision of a method and apparatus, which can improve operation efficiency of a memory system by determining the availability of additional data capable of being output along with target data based on the type of target data for which read has been requested and reading the target data and the additional data together from a memory die through one read operation based on a pending credit associated with the execution or stop of a correlation operation if the availability is a given reference or more.

In addition, an embodiment of the disclosure may provide a memory system including an address allocation scheme which reduces resources used for the correlation operation and supports an interleaving operation to a plurality of memory dies in the memory system, thereby increasing an operational efficiency of the memory system.

In accordance with an embodiment of the present invention, a memory system may include: multiple memory dies suitable for outputting data of different sizes in response to a read request; and a controller in communication with the multiple memory dies through multiple channels, and suitable for: performing a correlation operation on the read request so that the multiple memory dies interleave and output target data corresponding to the read request through the multiple channels, determining a pending credit using a result of the correlation operation, and reading, from the multiple memory dies, the target data corresponding to the read request and additional data stored in a same storage unit as the target data, based on a type of the target data corresponding to the read request and the pending credit.

Each of the multiple memory dies may include multiple blocks each comprising multiple pages each comprising multiple sections each comprising multiple memory cells and a page buffer suitable for caching data read from the multiple blocks, in page units, and each of the multiple memory dies may output data in section units or page units from the page buffer in response to the read request.

The controller may determine the pending credit based on whether a previous correlation operation has been performed prior to selection timing, whether the previous correlation operation was successful, and operating states of the multiple memory dies at the selection timing, the selection timing may indicate the time at which candidate read requests are selected as a target of the correlation operation among a plurality of base read requests.

If the candidate read request is a read request of a section unit, when processing the candidate read request, the controller may read, from the multiple memory dies, the target data corresponding to the candidate read request and the additional data stored in the same storage unit based on a type of the target data corresponding to the candidate read request and the pending credit at a processing timing, which is a time at which the candidate read request is processed, and the storage unit may be a page.

When the candidate read request is a read request of a section unit and the target data corresponding to the candidate read request is sequential data that is read-requested through an internal operation, the controller: may read the target data corresponding to the candidate read request and the additional data together from the same page when the pending credit at the processing timing is a first reference value or more, and may read only the target data corresponding to the candidate read request when the pending credit at the processing timing is less than the first reference value.

When the candidate read request is a read request of a section unit and the target data corresponding to the candidate read request is random data that is read-requested through an internal operation or data that is read-requested by a host, the controller may read only the target data corresponding to the candidate read request.

The controller may be further suitable for determining whether to perform the correlation operation on the candidate read request selected at the selection timing, based on a type of target data corresponding to the candidate read request selected at the selection timing and the pending credit at the selection timing.

When the target data of the candidate read request selected at the selection timing is data that is read-requested through an internal operation or random data that is read-requested by a host, the controller may perform the correlation operation on the candidate read request selected at the selection timing when the pending credit at the selection timing is the second reference value or more.

The controller: may decrease the pending credit when at least one of the multiple memory dies is in an idle state at the selection timing, may increase the pending credit when a previous candidate read request is processed without the correlation operation prior to the selection timing, may increase the pending credit when the previous correlation operation succeeded and decreases the pending credit when the previous correlation operation failed, and may reset the pending credit to an initial value when the candidate read request is not selected for a reference time or more after the determining of whether to perform the correlation operation.

In accordance with an embodiment of the present invention, an operating method of a memory system comprising multiple memory dies capable of outputting data of different sizes in response to a read request, the operating method may include: performing a correlation operation on the read request so that the multiple memory dies interleave and output target data corresponding to the read request through multiple channels, determining a pending credit using a result of the correlation operation; and reading, from the multiple memory dies, target data corresponding to the read request and additional data stored in a same storage unit as the target data, based on a type of the target data corresponding to the read request and the pending credit.

Each of the multiple memory dies may include multiple blocks each comprising multiple pages each comprising multiple sections each comprising multiple memory cells and a page buffer suitable for caching data read from the memory cells in page units, and each of the multiple memory dies may output the read data in section units or page units from the page buffer in response to the read request.

In the determining, the pending credit may be determined based on whether a previous correlation operation has been performed prior to selection timing, whether the previous correlation operation was successful, and operating states of the multiple memory dies at the selection timing, the selection timing may indicate the time at which candidate read requests are selected as a target of the correlation operation among a plurality of base read requests.

In the reading, when the candidate read request is a read request of a section unit, when the candidate read request is processed, the target data corresponding to the candidate read request and the additional data stored in the same storage unit may be read together from the multiple memory dies based on a type of the target data corresponding to the candidate read request and the pending credit at a processing timing, which is a time at which the candidate read request is processed, and the storage unit may be a page.

The reading may include: reading the target data corresponding to the candidate read request and the additional data together from the same page when the pending credit at the processing timing is a first reference value or more when the candidate read request is a read request of a section unit and the target data corresponding to the candidate read request is sequential data that is read-requested through an internal operation; reading only the target data corresponding to the candidate read request when the pending credit at the processing timing is less than the first reference value when the candidate read request is a read request of a section unit and the target data corresponding to the candidate read request is sequential data that is read-requested through an internal operation; and reading only the target data corresponding to the candidate read request when the candidate read request is a read request of a section unit and the target data corresponding to the candidate read request is random data that is read-requested through an internal operation or data that is read-requested by a host.

The operating method may further include determining whether to perform the correlation operation on the candidate read request selected at the selection timing, based on a type of data corresponding to the candidate read request selected at the selection timing and the pending credit at the selection timing.

The performing of the correlation may include: performing the correlation operation on the candidate read request selected at the selection timing when the target data of the candidate read request selected at the selection timing is data that is read-requested through an internal operation or random data that is read-requested by a host and when the pending credit at the selection timing is the second reference value or more.

The determining may include: decreasing the pending credit when at least one of the multiple memory dies is in an idle state at the selection timing; increasing the pending credit when a previous candidate read request is processed without the correlation operation prior to the selection timing; increasing the pending credit when the previous correlation operation succeeded; decreasing the pending credit when the previous correlation operation failed; and resetting the pending credit to an initial value when the candidate read request is not selected for a reference time or more after the determining of whether to perform the correlation operation.

The operating method may further include: identifying, in a first transmission operation, a target address for a read request correlated due to a success of the correlation operation and transmitting the target address to the multiple memory dies through the multiple channels; receiving, in a first receiving operation, data corresponding to the correlated read request in an interleaving manner through the multiple channels after the first transmission operation; identifying, in a second transmission operation, a target address for a read request not correlated due to a failure of the correlation operation and transmitting the target address to the multiple memory dies; receiving, in a second receiving operation, from the multiple memory dies, data corresponding to the not-correlated read request after the second transmission operation; and outputting, to an external apparatus, the data received in the first or second receiving operation.

In accordance with an embodiment of the present invention, a memory system may include: a memory device including plural dies, each having plural pages, each having plural sections; and a controller electrically coupled to the dies through plural channels respectively and suitable for providing the dies with read commands requesting data to be read from sections of different offsets within the respective dies, and controlling the dies to read the requested data according to a full sync interleaving scheme, the controller may control each of the dies to perform a read operation in units of the sections or in units of the pages according to a type of a corresponding read command among the provided read commands.

DETAILED DESCRIPTION

Figure 1A:
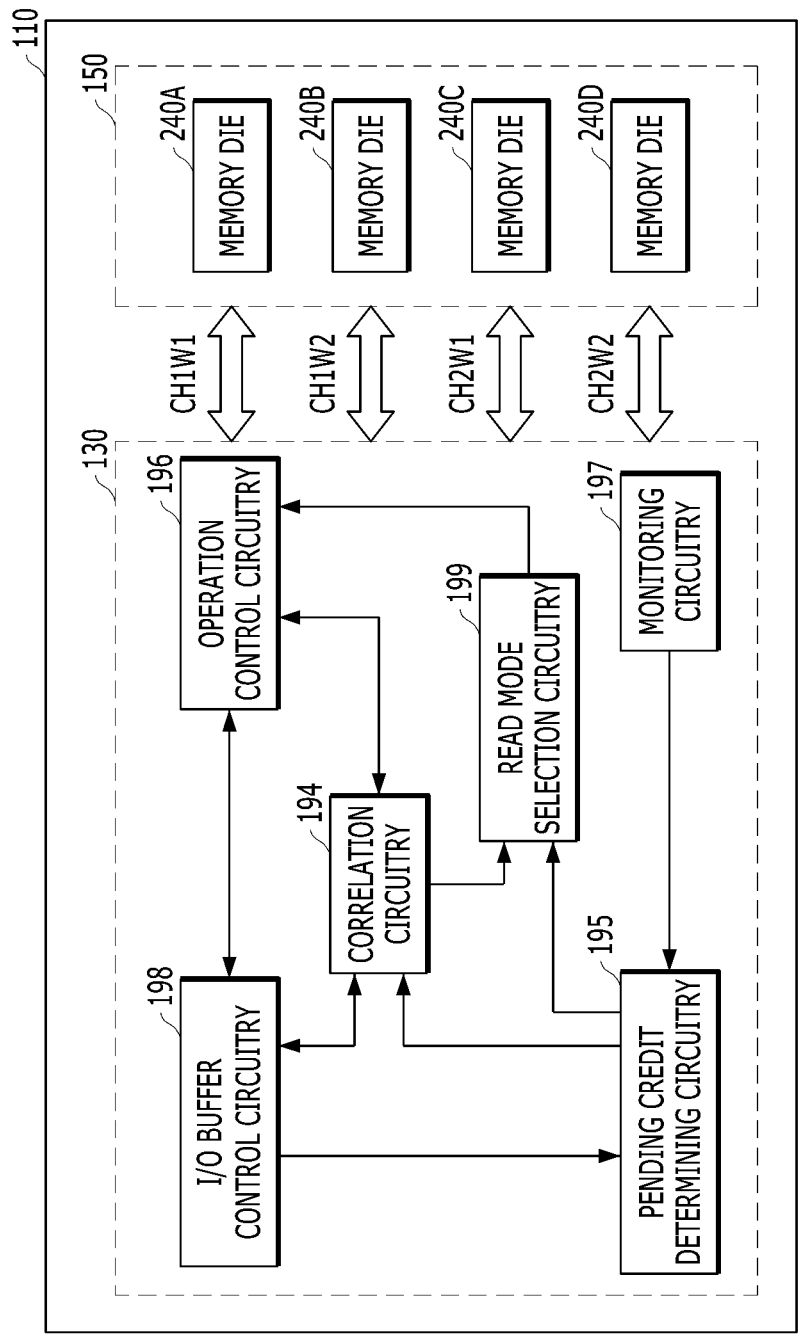
FIGS. 1A and 1B are block diagrams illustrating a memory system in accordance with an embodiment of the present invention.

Various examples of the disclosure are described below in more detail with reference to the accompanying drawings. Aspects and features of the present invention, however, may be embodied in different ways to form other embodiments, including variations of any of the disclosed embodiments. Thus, the invention is not to be construed as being limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to limit the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

Figure 1B:
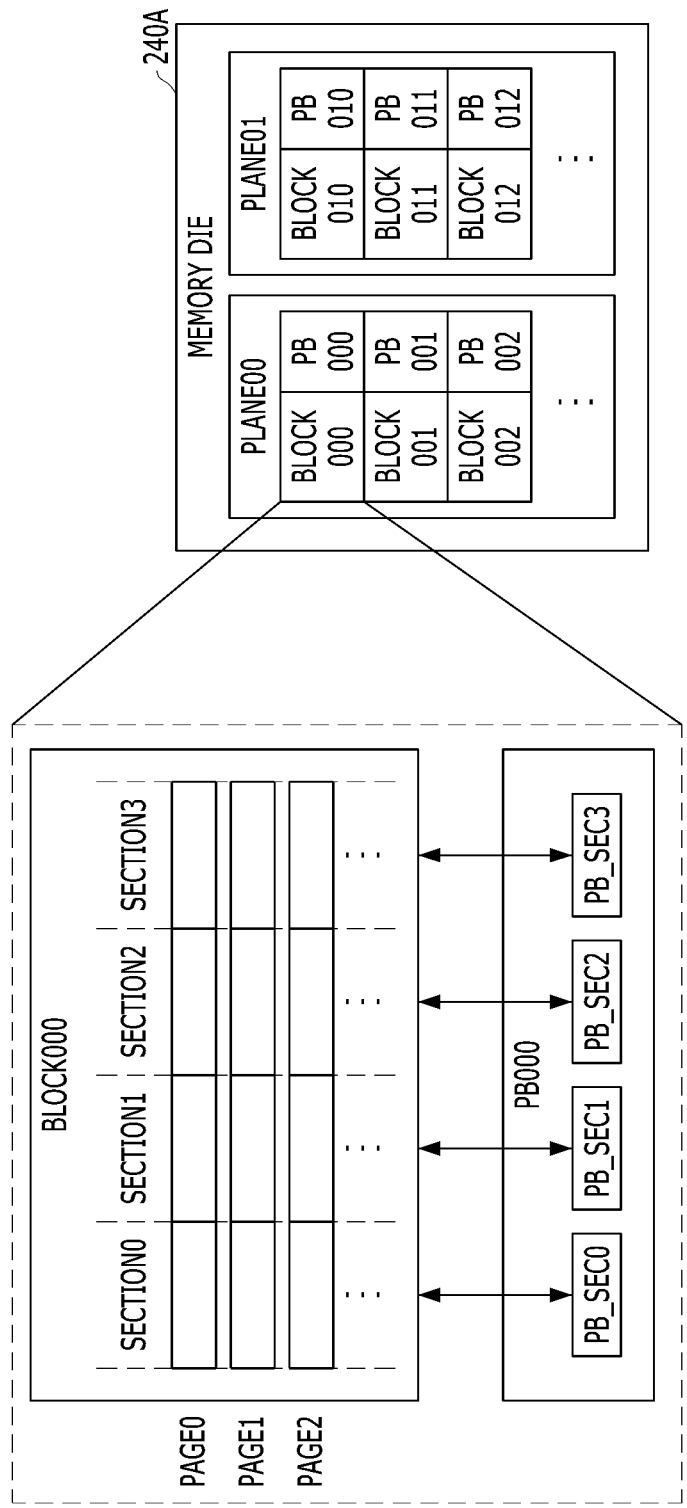

FIGS. 1A and 1B are block diagrams illustrating a memory system in accordance with an embodiment of the present invention. In a computing device or a mobile device embedded with the memory system 110, a host (e.g., host 102 of FIG. 2) may be engaged with the memory system 110 for data input/output (I/O) operations. The host is an external device operatively engaged with the memory system 110.

Referring to FIG. 1A, the memory system 110 may include a controller 130 and a memory device 150. The controller 130 may output data, which is requested by the host 102 and delivered from the memory device 150, or store data inputted from the host 102 in the memory device 150. Furthermore, the controller 130 may internally generate data in order to manage an operation of storing or outputting the data of the host 102, and may store or output the data in or to the memory apparatus 150. The memory device 150 may include a plurality of non-volatile memory cells, each capable of storing data. Here, an internal structure and/or configuration of the memory device 150 may vary depending on the applicable specification or desired performance of the memory device 150, which, in turn, may be based on the purpose(s) for which the memory system 110 is used or the requirement(s) of the host 102.

The controller 130 and the memory device 150 may be coupled through a plurality of data paths. The memory device 150 may include a plurality of memory dies 240A, 240B, 240C, 240D, which may be coupled with the controller 130 through different data paths. The first memory die 240A and the controller 130 are coupled through a first channel (CH1) and a first way (W1) CH1W1, and the second memory die 240B and the controller 130 are coupled through the first channel (CH1) and a second way (W2) CH1W2. The first memory die 240A and the second memory die 240B may share the first channel CH1, but the first memory die 240A and the second memory die 240B may use different ways W1, W2 independently. In addition, the third memory die 240C and the controller 130 are coupled through the second channel (CH2) and the first way (W1) CH2W1, and the fourth memory die 240D and the controller 130 are coupled via the second channel (CH2) and the second way (W2) CH2W2. The number of channels and/or ways constituting the data paths between the controller 130 and the memory device 150 may vary depending on the number of memory dies in the memory device 150. The number of channels and ways connecting the memory dies 240A, 240B, 240C, 240D to the controller 130 may be different, according to the purpose(s) of the memory system 110 or requirement(s) of the host 102.

Referring to FIG. 1B, each of the multiple memory dies 240A, 240B, 240C, and 240D may include multiple pages PAGE0, PAGE1, PAGE2, . . . each including multiple memory cells, multiple blocks BLOCK000, BLOCK001, BLOCK002, . . . , BLOCK010, BLOCK011, BLOCK012, . . . each including multiple pages PAGE0, PAGE1, PAGE2 . . . , and a plurality of planes PLANE00 and PLANE01 each including a subset of all of the blocks of the memory device 150. Furthermore, each of the multiple memory dies 240A, 240B, 240C, and 240D may include page buffers PB000, PB001, PB002, . . . , PB010, PB011, PB012, . . . for caching data input to or output from the blocks BLOCK000, BLOCK001, BLOCK002, . . . , BLOCK010, BLOCK011, BLOCK012, . . . , respectively, in units of pages.

Furthermore, each of the pages PAGE0, PAGE1, PAGE2, . . . may include a set number of sections SECTION0, SECTION1, SECTION2, and SECTION3. That is, the sum of all memory cells included in each of the sections SECTION0, SECTION1, SECTION2, and SECTION3 may be with the same as the number of memory cells included in one of the pages PAGE0, PAGE1, PAGE2, . . . . Furthermore, each of the page buffers PB000, PB001, PB002, . . . , PB010, PB011, PB012, . . . may include a set number of section page buffers PB_SEC0, PB_SEC1, PB_SEC2, and PB_SEC3, in accordance with each of the pages PAGE0, PAGE1, PAGE2, . . . each including the set number of sections SECTION0, SECTION1, SECTION2, and SECTION3. an amount of data less than a page can be input or output through the aforementioned configuration in which each of the pages PAGE0, PAGE1, PAGE2, . . . includes the sections SECTION0, SECTION1, SECTION2, and SECTION3. For example, assuming that four sections SECTION0, SECTION1, SECTION2, and SECTION3 are included in one page as in FIG. 1B, in order to input or output data in units of pages, the data may be input or output using all of the four sections SECTION0, SECTION1, SECTION2, and SECTION3 and the corresponding four section page buffers PB_SEC0, PB_SEC1, PB_SEC2, and PB_SEC3. In order to input or output data in a unit smaller than a page unit, that is, in unit(s) of a section, the data may be input or output selecting only three or two or one of the four sections SECTION0, SECTION1, SECTION2, and SECTION3. In this case, data not selected for data input or output may have been stored in the remaining section(s), that is excluding section(s) that has/have been selected for data input or output.

If data is output from some sections of the sections, it is possible to use a method of reading all data stored in those sections, caching the read data in the corresponding section page buffers, selecting and outputting only data cached in section page buffers that belong to the section page buffers that correspond to the selected sections, and deleting data, cached in the remaining section page buffers that have not been selected, without outputting the data. As described above, if an operation of inputting or outputting data in a unit smaller than a page unit, that is, in a section unit, is supported in addition to an operation of inputting or outputting data in a page unit, the time taken for a read operation may be different depending on from how many sections data is read through one read operation.

For example, if data is read from the first and second sections SECTION0 and SECTION1 of the four sections, after all of the data of the four sections is cached in the four section page buffers PB_SEC0, PB_SEC1, PB_SEC2, and PB_SEC3, only the data of the first and second section page buffers PB_SEC0 and PB_SEC1 will be output. If data is read from all of the four sections SECTION0, SECTION1, SECTION2, and SECTION3, after all of the data of the four sections is cached in the four section page buffers PB_SEC0, PB_SEC1, PB_SEC2, and PB_SEC3, the data of all of the four section page buffers will be output. In this case, there may be a time difference between the operation of outputting only the data of the two section page buffers PB_SEC0 and PB_SEC1 of the four section page buffers and the operation of outputting the data of all of the four section page buffers PB_SEC0, PB_SEC1, PB_SEC2, and PB_SEC3. Regardless of whether data is read from the two sections SECTION0 and SECTION1 or data is read from all of the four sections, the data of all of the four sections needs to be cached in the four section page buffers PB_SEC0, PB_SEC1, PB_SEC2, and PB_SEC3. Accordingly, the time necessary to read data from the four sections SECTION0, SECTION1, SECTION2, and SECTION3 may be less than two times the time necessary to read data from the two sections SECTION0 and SECTION1. For example, the time necessary to read data from the four sections SECTION0, SECTION1, SECTION2, and SECTION3 may be about 1.4 times the time necessary to read data from the two sections SECTION0 and SECTION1.

For reference, FIG. 1B illustrates a detailed configuration of the first memory die 240A of the multiple memory dies 240A, 240B, 240C, and 240D. The remaining memory dies 240B, 240C, and 240D (not illustrated) may have the same configuration as the first memory die 240A.

Referring to FIG. 1A, the plurality of memory dies 240A, 240B, 240C, 240D in the memory device 150 may be configured as different modules and independently coupled with the controller 130 via different data paths. When multiple data paths are used for data exchange, the plurality of memory dies 240A, 240B, 240C, 240D and the controller 130 may use an interleaving scheme via the multiple data paths for exchanging data to increase speed of data transfer.

For the interleaving scheme to enhance the speed of data transfer between the memory device 150 and the controller 130, data to be stored is distributed over several modules rather than in a single module. In executing an interleaving scheme, a memory system may use an address limitation structure or an address scheme for distributing and storing plural pieces of new data over and in a plurality of modules of the memory device 150. For example, when programming four pieces of data, the conventional memory system stores the four pieces of data in four memory dies individually. Here, the number of pieces of data may refer to the number of data units which may be stored together by a single program operation or a single write operation can be performed. For example, when a program operation (or a write operation) in a unit of page is performed, four pieces of data may include an amount of data programmed in four pages.

In order to increase operational efficiency of program and read operations and enhance distributed storage, a memory system may employ an address limitation structure. In the address limitation structure, when four pieces of data are programmed in four memory dies, the same physical location in each memory die is allocated. For example, when storing the four pieces of data in the four memory dies, each of the four pieces of data may be individually stored in a fifth physical location of a respective one of the four memory dies. Thereafter, when eight pieces of data are programmed, the eight pieces of data may be stored in the sixth and seventh physical locations of each memory die. Here, the physical location may indicate a block or a page in a memory die.

When storing five pieces of data in four memory dies in a memory system with the address limitation structure, two pieces of data may be stored in first and second physical locations of one memory die, and three pieces of data may be individually stored in a first physical location of the other three memory dies respectively. In the memory system with the address limitation structure, three pieces of dummy data are individually written in a second physical location of the remaining three memory dies because a piece of data inputted along with the next program request cannot be subsequently written in the second physical location of the other three memory dies.

When a memory system has an address limitation structure for an interleaving operation, operational efficiency may be degraded because pieces of dummy data may be programmed whenever a program operation with odd pieces of data, or a number of pieces of data that does not match the number of memory dies, is performed. In addition, because each memory die does not always have the same operation state (in terms of health, wear, etc.), the memory system may independently perform an additional operation to compensate for each memory die condition, which may increase overhead. In other words, an operation condition that affects one memory die may delay memory operations for associated memory dies involved in the same interleaving operation.

The memory system 110 according to an embodiment of the disclosure adopts a full sync interleaving structure which is capable of supporting interleaving operations between the controller 130 and the memory device 150 without an address limitation structure. The full sync interleaving structure does not have an address limitation for storing data at the same location in each of a plurality of memory dies 240A, 240B, 240C, 240D in the memory device 150. The controller 130 may distribute pieces of data to be programmed according to an operation condition and an operation state of each memory die. In doing so, the pieces of data need not be evenly distributed among the memory dies. For example, if one of the four memory dies 240A, 240B, 240C, 240D (say memory die 240A) cannot program a piece of data immediately due to an internal operation being performed within, the controller 130 may transfer data to the remaining memory dies (e.g., 240B, 240C, 240D). The controller 130 may distribute data over the plurality of memory dies 240A, 240B, 240C, 240D to increase efficiency of data transmission and reduce an operation margin of a program operation without applying a strict rule such as the address limitation structure. In addition, in a memory system 110 according to an embodiment, it is unnecessary to program dummy data, as is the case in a memory system with the address limitation structure.

After the controller 130 transfers a piece of data into the memory device 150 and the piece of data is programmed in the memory device 150, the controller 130 may generate or update map information associating a logical address with a physical location (physical address) corresponding to the data. In addition, the controller 130 may store generated or updated map information in the memory device 150.

Because the memory system 110 does not adopt the address limitation structure as described above, it might be hard to guarantee that data transmission between the controller 130 and the memory device 150 in a process of reading and outputting plural pieces of data requested by an external device, e.g., a host, performed in an interleaving format (interleaved). Accordingly, the controller 130 may include correlation circuitry 194 for correlating a plurality of read operations requested by the host so that plural pieces of data outputted from the memory device 150 by the plurality of read operations may be interleaved.

Referring to FIG. 1A, the controller 130 may include an input/output (I/O) buffer control circuitry 198, a correlation circuitry 194, an operation control circuitry 196, a pending credit determining circuitry 195, a monitoring circuitry 197, and a read mode selection circuitry 199.

As used in this disclosure, the term 'circuitry' may refer to one or more of (a) hardware-only circuit implementations, such as implementations in only analog and/or digital circuitry (b) combinations of circuits and software (and/or firmware), such as: (i) a combination of processor(s) or (ii) portions of processor(s)/software including digital signal processor(s), software, and memory that work together to cause an apparatus, such as a mobile phone or server, to perform various functions and (c) to circuits, such as a microprocessor or a portion of a microprocessor, that uses software or firmware, even if the software or firmware is not physically present. As a further example, the term "circuitry" may refer to one or more processor or portion of a processor and accompanying software and/or firmware. The term "circuitry" may refer to an integrated circuit for a storage device.

The I/O buffer control circuitry 198 may control an input buffer in which a command or data from the host or a command or data generated within the controller has been temporarily stored and/or an output buffer in which data corresponding to a command from the host or a command generated within the controller has been temporarily stored. For example, when the host transmits a read request (or read command) for fifteen pieces of data to the memory system 110, the controller 130 may store the read request in the input buffer, may receive, from the memory apparatus 150, the fifteen pieces of data corresponding to the read request, may temporarily store the fifteen pieces of data in the output buffer, and then may output the fifteen pieces of data to the host. Furthermore, the controller 130 may internally generate a read request for five pieces of data, may store the read request in the input buffer, may receive, from the memory apparatus 150, the five pieces of data corresponding to the read request, may temporarily store the five pieces of data in the output buffer, and then may use the five pieces of data for an operation within the controller 130. The I/O buffer control circuitry 198 may recognize how many read requests have been stored in the input buffer. The I/O buffer control circuitry 198 may recognize how many data has been stored in the output buffer.

The operation control circuitry 196 may identify a physical location of the memory apparatus 150 where read-requested data is stored, and may read the read-requested data from the identified physical location. If a read request stored in the input buffer has been received from the host, a logical address corresponding to the read request may have included in the read request. In such a case, the operation control circuitry 196 may translate the logical address into a physical address based on map information in accordance with the read request (or read command) and the logical address received from the input buffer, and may request the data of the physical address from the memory apparatus 150. If a read request stored in the input buffer has been internally generated and transmitted by the controller, a physical address corresponding to the read request may have been included in the read request. In such a case, the operation control circuitry 196 may identify the physical address received from the input buffer, and may request, from the memory apparatus 150, data corresponding to the read request. In this case, the physical address may indicate a specific location within the multiple memory dies 240A, 240B, 240C, and 240D of the memory apparatus 150. If the operation control circuitry 196 performs a read request in order stored in the input buffer, a physical address may randomly indicate one of the multiple memory dies 240A, 240B, 240C, and 240D. In this case, an interleaving operation may or may not be performed.

When the I/O buffer control circuitry 198 determines that data to be output to the host is stored in the output buffer, it may transmit, to the correlation circuitry 194, a read request (or read command) stored in the input buffer. The correlation circuitry 194 may check map information regarding the plural logical addresses corresponding to the plural read requests from the I/O buffer control circuitry 198 to correlate the plural read requests, so that the operation control circuitry 196 may perform plural read operations corresponding to the plural read requests according to an interleaving scheme, e.g., plural pieces of data are interleaved between the plurality of memory dies 240A, 240B, 240C, 240D. Herein, a correlation operation performed by the correlation circuitry 194 may support parallel processing and distributed computing between the controller 130 and the plurality of memory dies 240A, 240B, 240C, 240D. When a single data path is shared by plural components, the plural components may interleave their signals or their data in the single data path. Further, when plural data paths are used by a single component, the single component may distribute plural signals or plural data over the plural data paths. The correlation operation may enable some of a plurality of read requests to be delivered into the plurality of memory dies in parallel through the plurality of channels, so that plural pieces of data corresponding to the plurality of read requests are outputted in parallel from the plurality of memory dies via the plurality of channels. The correlation operation for a plurality of read requests may include that plural pieces of data requested to the memory dies 240A, 240B, 240C, 240D may be transferred from the memory device 150 to the controller 130 according to an interleaved format.

For example, it is assumed that the host requests fifteen pieces of data stored in the memory apparatus 150 and requests five pieces of data generated within the controller 130. The controller 130 may receive a read request for the fifteen pieces of data from the host, and may generate a read request for the internally generated five pieces of data. Furthermore, the I/O buffer control circuitry 198 may transmit the 20 read requests for the twenty pieces of data to the correlation circuitry 194. The correlation circuitry 194 performs correlation operation on the 20 read requests for the twenty pieces of data. The correlation circuitry 194 tries to correlate the 20 read requests so that at least some of the twenty pieces of data are outputted according to an interleaving scheme. For example, the correlation circuitry 194 may check a physical address corresponding to a first logical address inputted along with a first read request among the 20 read requests, and recognize that first data corresponding to the first logical address is stored in the first memory die 240A. The correlation circuitry 194 may check a physical address corresponding to a second logical address inputted along with a second read request among the 20 read requests. When second data corresponding to the second read request is stored in the third memory die 240C or the fourth memory die 240D, an interleaving operation between the first and second read requests may be expected because the first data and the second data respectively corresponding to the first and second read requests may be transmitted via different channels CH1, CH2. Thus, the first and second read requests may be correlated by the correlation circuitry 194, and correlated read requests may be transmitted to the operation control circuitry 196.

However, if the second data is stored in the first memory die 240A or the second memory die 240B, the interleaving operation between the first and second read requests may not be expected because the first data and the second data respectively corresponding to the first and second read requests may be transmitted via the same channel CH1. In this case, the correlation circuitry 194 may not pair or correlate the first and second read requests. Then, the correlation circuitry 194 may check a physical address for a third read request. When third data corresponding to the third read request is stored in the third memory die 240C or the fourth memory die 240D, an interleaving operation between the first request and the third request may be expected because the first data and the third data respectively corresponding to the first and third read requests may be transmitted via different channels CH1, CH2. The correlation circuitry 194 may correlate the first read request and the third read request and transmit the correlated read request to the operation control circuitry 196. The third read request may be transmitted earlier than the second read request.

However, if the third data is stored in the first memory die 240A or the second memory die 240B, the interleaving operation between the first request and the third request may not be expected because the first and third data are transmitted via the same channel. In this case, the correlation circuitry 194 may check a physical address for a fourth read request.

As described above, the correlation circuitry 194 may check a physical location where data corresponding to a read request is stored, correlate some of read requests when an interleaving operation between the read requests may be expected, and transfer correlated read requests to the operation control circuitry 196. For the correlation operation, the correlation circuitry 194 may refer to map information in the controller 130 or loaded in a memory or a buffer of the controller 130.

The correlation operation with respect to a plurality of read requests, which is performed by the correlation circuitry 194, may adversely affect data input/output performance such as I/O throughput of the memory system 110 because the correlation operation may cause a delay.

Accordingly, the I/O buffer control circuitry 198 may not transmit, to the correlation circuitry 194, all of read requests received from the host or generated within the controller 130. That is, the I/O buffer control circuitry 198 may select at least some second read requests (candidate read requests) among a plurality of base read requests received from the host 102 or generated within the controller, and may transmit only the candidate read requests to the correlation circuitry 194. For example, although the memory system 110 identifies data to be output from the output buffer to the host and the correlation circuitry 194 performs a correlation operation, the I/O buffer control circuitry 198 may transmit, to the correlation circuitry 194, a read request received from the host or generated within the controller only when it is determined that the transmission of the read request does not influence data I/O throughput of the memory system 110. Each of the base and candidate read requests may be any normal read request directing the memory apparatus 150 to read target data therefrom. The I/O buffer control circuitry 198 may receive the base read request from the host 102. The base read request may be selected as the candidate read request by the I/O buffer control circuitry 198. The base and candidate read requests are described in more detail with reference to FIGS. 11A to 11C.

Furthermore, the correlation circuitry 194 may not perform correlation operation on any of the candidate read requests received from the I/O buffer control circuitry 198. That is, the correlation circuitry 194 may or may not perform a correlation operation on a candidate read request received from the I/O buffer control circuitry 198 based on a pending credit. For example, when a pending credit is a reference value or more, the correlation circuitry 194 may perform a correlation operation on a candidate read request received from the I/O buffer control circuitry 198. In contrast, when the pending credit is less than the reference value, the correlation circuitry 194 may not perform a correlation operation on the candidate read request received from the I/O buffer control circuitry 198. In this case, the pending credit may be used as an index by which a probability, possibility, pattern or trend for the correlation operation of the candidate read request can be predicted when the correlation circuitry 194 performs the correlation operation on the candidate read request received from the I/O buffer control circuitry 198. Based on such a pending credit, the controller 130 can improve efficiency of an internal operation by avoiding the execution of an unnecessary correlation operation or a correlation operation that causes overhead within the memory system 110.

Furthermore, a correlation operation performed by the correlation circuitry 194 may succeed or fail depending on a physical location of data corresponding to a candidate read request received from the I/O buffer control circuitry 198. If an interleaving operation for the physical location of the data corresponding to the candidate read request is predicted, it may be said that a correlation operation performed by the correlation circuitry 194 has been successful. The candidate read request correlated by the correlation circuitry 194 may be transmitted to the operation control circuitry 196 in the correlated state due to the success of the correlation operation. However, if an interleaving operation for the physical location of data corresponding to the candidate read request is not predicted, it may be said that a correlation operation performed by the correlation circuitry 194 has failed. The candidate read request not correlated by the correlation circuitry 194 may be transmitted to the operation control circuitry 196 in the uncorrelated state due to the failure of the correlation operation. Furthermore, it may not be necessary to determine whether to perform a correlation operation performed by the correlation circuitry 194 based on the type of data corresponding to a candidate read request received from the I/O buffer control circuitry 198. That is, if data corresponding to a candidate read request received from the I/O buffer control circuitry 198 is sequential read-requested data, the correlation circuitry 194 may not perform a correlation operation on the candidate read request. The reason for this is that if read data requested by the host 102 is sequential data, the amount of such data is highly likely to be relatively large and the data is highly likely to be distributed and stored in multiple memory dies in an interleaving manner even when the data is written in the memory apparatus 150. Accordingly, although the correlation circuitry 194 does not perform a separate correlation operation, a plurality of sequentially input candidate read requests are highly likely to be read in an interleaving manner. For example, multiple read requests corresponding to files having a relatively high capacity, such as a movie or music, may correspond to sequential read data requested by the host 102.

When a candidate read request is selected from the base read requests, the pending credit determining circuitry 195 may determine a pending credit based on whether a previous correlation operation has been performed prior to selection timing at which the candidate read request is selected, whether the previous correlation operation is successful prior to the selection timing, and operating states of the multiple memory dies 240A, 240B, 240C, and 240D at the selection timing. In this case, the operating states of the multiple memory dies 240A, 240B, 240C, and 240D may be recognized by the monitoring circuitry 197. That is, when a candidate read request to be transmitted from the I/O buffer control circuitry 198 to the correlation circuitry 194 is selected, the pending credit determining circuitry 195 may adjust a value of a pending credit based on whether a previous correlation operation has been performed by the correlation circuitry 194 prior to selection timing at which the candidate read request is selected, whether an executed correlation operation has been successful if the correlation operation has been performed, and an operating states of the multiple memory dies 240A, 240B, 240C, and 240D at the selection timing.

The state in which a value of the pending credit is sufficiently higher than a reference value may mean that an operation margin of the controller 130 is sufficient. That is, this may mean that although the correlation circuitry 194 performs a correlation operation, it may not have a bad influence on data I/O throughput of the memory system 110.

When a value of a pending credit is sufficiently higher than a reference value as described above, the controller 130 may read, from the multiple memory dies 240A, 240B, 240C, and 240D, target data corresponding to a read request and additional data stored in the same storage unit as the target data, separately from a correlation operation performed by the correlation circuitry 194. The same storage unit may be a page. The target data and the additional data may be stored in sections within the same page. That is, when a value of the pending credit is sufficiently higher than the reference value, the controller 130 may perform a correlation operation on at least some of multiple read requests received from the host or generated within the controller, and may read, from the multiple memory dies 240A, 240B, 240C, and 240D, target data corresponding to the at least some of the multiple read requests and additional data stored in the same storage unit as the target data. In this case, although the pending credit is sufficiently higher than the reference value, the controller 130 may read the additional data along with the target data only when the type of target data corresponding to a read request is a predefined type. In this case, a reference value of the pending credit, that is, a criterion for whether to perform a correlation operation on the read request, and a reference value, that is, a criterion for whether to read the additional data along with the target data corresponding to the read request, may be different. For example, assuming that a reference value, that is, a criterion for whether to read additional data along with target data corresponding to a read request, is a first reference value and a reference value of a pending credit, that is, a criterion for whether to perform a correlation operation on the read request, is a second reference value, the first reference value and the second reference value may be equal or different. Furthermore, the first reference value may be greater or smaller than the second reference value.

In other words, when a pending credit is sufficiently higher than a reference value, the controller 130 may read, from the multiple memory dies 240A, 240B, 240C, and 240D, additional data stored in the same storage unit as the target data depending on the type of target data corresponding to a read request.

In this case, all of a plurality of base read requests received from the host or generated within the controller may be read requests for the target data. However, the state in which a pending credit is sufficiently higher than a reference value may be assumed as the state in which at least some candidate read requests of the plurality of base read requests are selected and a correlation operation is frequently performed on the selected candidate read requests. A separate additional operation that is performed on read requests not selected as a target of the correlation operation in the state in which the correlation operation is frequently performed as described above may be an inefficient operation. Accordingly, the controller 130 may perform an operation of selecting whether to read target data and additional data together or read only the target data on only the candidate read request that belongs to the plurality of base read requests and that has been selected as a target of a correlation operation. In such a case, a first reference value of a pending credit, that is, a criterion for whether to read additional data along with target data corresponding to a read request, may be identical with or higher than a second reference value of the pending credit, that is, a criterion for whether to perform a correlation operation on the read request. For reference, the controller 130 may also perform an operation of selecting whether to read target data and additional data together or whether to read only the target data on a read request that belongs to the plurality of base read requests and that has not been selected as a target of a correlation operation.

Referring to the relation between the pages and the sections illustrated in FIG. 1B, target data corresponding to a read request and additional data stored in the same storage unit as the target data may be defined. Specifically, if the target data corresponding to the read request is data from a particular section, the data of all pages in that section in addition to the requested section in which the target data has been stored may be cached in a page buffer. An operation of selecting and outputting only data of some sections, among data of a page unit already cached in the page buffer, in a section unit and an operation of outputting all data of the page unit may be similar in their operation control methods, and may not have a great difference in their processing time. Accordingly, when data corresponding to a read request is defined as target data, additional data stored in the same storage unit as the target data may be data stored in the same page as the target data.

This is described again with reference to FIG. 1B. If a candidate read request that belongs to a plurality of base read requests and that has been selected as a correlation operation target is a read request of a section unit that is smaller than a page unit, when the controller 130 processes the candidate read request, the controller 130 may read, from the multiple memory dies 240A, 240B, 240C, and 240D, target data corresponding to the candidate read request and additional data stored in the same page as the target data together based on the type of target data corresponding to the candidate read request and a pending credit at the processing timing of the candidate read request.

If a read request transmitted from the correlation circuitry 194 to the operation control circuitry 196 is a read request of a section unit, the read mode selection circuitry 199 may select a read mode based on the type of target data corresponding to the transmitted read request and a pending credit at the transmission timing of the read request. The read mode selected by the read mode selection circuitry 199 as described above may be applied to the operation control circuitry 196, and may be applied when the read request received from the correlation circuitry 194 is processed.

That is, the operation control circuitry 196 may identify a physical location of the memory apparatus 150 where read-requested data is stored, and may read the read-requested data from the identified physical location by applying the read mode selected by the read mode selection circuitry 199.

The controller 130 may perform a correlation operation on at least some of multiple read requests received from the host or generated within the controller in accordance with an operating environment so that the transmission of data between the memory apparatus 150 and the controller 130 is performed through interleaving. In addition, the memory system 110 does not have to adopt an address limitation structure for exchanging signals or data according to an interleaving scheme within the memory system 110. Plural pieces of data may be distributed and stored based on operation environment and operation states of the plurality of memory dies 240A, 240B, 240C, 240D in the memory device 150. The controller 130 may attempt to correlate read requests for reading plural pieces of data stored in the plurality of memory dies 240A, 240B, 240C, 240D in the memory device 150. Because the memory system 110 does not have to use the address limitation structure, the plurality of memory dies 240A, 240B, 240C, 240D in the memory device 150 may be operated more efficiently, and lifespans of the plurality of memory dies 240A, 240B, 240C, 240D in the memory device 150 may be improved. On the other hand, since data may be interleaved in memory dies 240A, 240B, 240C, 240D, the memory system 110 according to an embodiment of the disclosure can avoid deteriorating the data input/output performance (e.g., I/O throughput) thereof.

Figure 2:
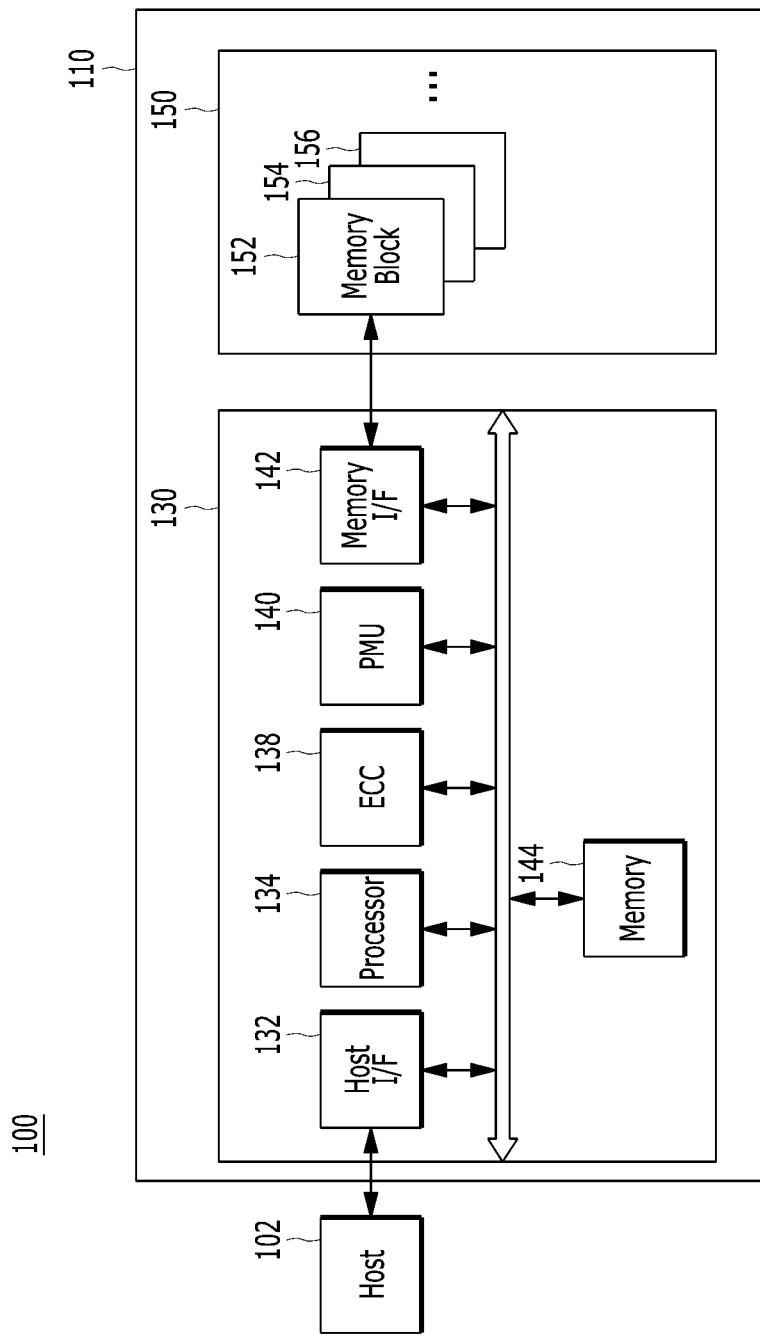
FIG. 2 is a block diagram illustrating a data processing system including a memory system in accordance with an embodiment of the present invention.

FIG. 2 is a block diagram illustrating a data processing system including a memory system in accordance with an embodiment of the present invention.

Referring to FIG. 2, the data processing system 100 may include a host 102 engaged or operably coupled with a memory system 110.

The host 102 may include any of a variety of portable electronic devices, such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS may provide interoperability between the host 102 engaged with the memory system 110 and the user of the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. The enterprise operating systems may be specialized for securing and supporting high performance, including Windows servers, Linux and Unix. Further, the mobile operating system may include an Android and iOS. The mobile operating system may be subject to support services or functions for mobility (e.g., a power saving function). The host 102 may include a plurality of operating systems. The host 102 may execute multiple operating systems in cooperation with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described below with reference to FIGS. 4 and 5.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented with a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as described above.

By way of example but not limitation, the controller 130 and the memory device 150 may be integrated into a single semiconductor device. The controller 130 and memory device 150 may be integrated to form an SSD with improved operation speed. When the memory system 110 is used as an SSD, the operating speed of a host 102 connected to the memory system 110 can be improved more than that of a host 102 connected with a hard disk. In another embodiment, the controller 130 and the memory device 150 may be integrated into one semiconductor device to form a memory card, such as a PC card (PCMCIA), a compact flash card (CF), a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes memory blocks, among the plurality of memory blocks 152, 154, 156. In addition, the memory device 150 may be a non-volatile memory device, for example a flash memory, and the flash memory may have a three-dimensional stack structure.

The controller 130 may control overall operations of the memory device 150, such as read, write, program and erase operations. For example, the controller 130 may control the memory device 150 in response to a request from the host 102. The controller 130 may provide data, read from the memory device 150 to the host 102. The controller 130 may store data provided by the host 102 into the memory device 150.

The controller 130 may include a host interface (I/F) 132, a processor 134, error correction code (ECC) circuitry 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL). According to an embodiment of the present invention, the host interface 132 may include the I/O buffer control circuitry 198 described above with reference to FIG. 1A.

The ECC circuitry 138 may correct error bits of the data to be processed in (e.g., outputted from) the memory device 150. To that end, the ECC circuitry 138 may include an ECC encoder and an ECC decoder. Here, the ECC encoder may perform error correction encoding of data to be programmed in the memory device 150 to generate encoded data into which a parity bit is added and store the encoded data in memory device 150. The ECC decoder may detect and correct errors contained in data read from the memory device 150 when the controller 130 reads the data stored in the memory device 150. In other words, after performing error correction decoding on the data read from the memory device 150, the ECC circuitry 138 may determine whether the error correction decoding has succeeded and output an instruction signal (e.g., a correction success signal or a correction fail signal). The ECC circuitry 138 may use the parity bit which is generated during the ECC encoding process, for correcting the error bit of the read data. When the number of error bits is greater than or equal to a threshold number of correctable error bits, the ECC circuitry 138 may not correct error bits but instead may output an error correction fail signal indicating that the error bits are uncorrectable.

The ECC circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC circuitry 138 may include any and all circuits, modules, systems or devices for performing the error correction operation based on at least one of the above described codes.

The PMU 140 may manage electrical power in the controller 130. For example, the PMU 140 may detect power-on and power-off. In addition, the PMU 140 may include a power detector.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a flash interface layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data used by the controller 130 and the memory device 150 to perform operations such as read operations or program/write operations.

The memory 144 may be a volatile memory. The memory 144 may be implemented with a static random access memory (SRAM), a dynamic random access memory (DRAM) or both. Although FIG. 2 shows memory 144 disposed within the controller 130, embodiments are not limited to that arrangement. That is, the memory 144 may be within or external to the controller 130. For instance, the memory 144 may be an external volatile memory having a memory interface transferring data and/or signals between the memory 144 and the controller 130.

The memory 144 may store data for performing operations such as data writing and data reading requested by the host 102 and/or data transfer between the memory device 150 and the controller 130 for background operations such as garbage collection and wear levelling. In accordance with an embodiment, for supporting operations in the memory system 110, the memory 144 may include a program memory, a data memory, a write buffer/cache, a read buffer/cache, a data buffer/cache and a map buffer/cache.

The processor 134 may be a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be a flash translation layer (FTL). The FTL may serve as an interface between the host 102 and the memory device 150. The host 102 may transmit requests for write and read operations to the memory device 150 through the FTL.

According to an embodiment, the processor 134 and the memory interface 142 may be used to perform an operation of the operation control circuitry 196, which is described above with reference to FIG. 1A. According to another embodiment, the processor 134 and the memory interface 142 may be used to perform an operation of the correlation circuitry 194, which is described above with reference to FIG. 1A. According to another embodiment, the processor 134 and the memory interface 142 may be used to perform an operation of the pending credit determining circuitry 195, which is described above with reference to FIG. 1A. According to another embodiment, the processor 134 and the memory interface 142 may be used to perform an operation of the monitoring circuitry 197, which is described above with reference to FIG. 1A. According to another embodiment, the processor 134 and the memory interface 142 may be used to perform an operation of the read mode selection circuitry 199, which is described above with reference to FIG. 1A.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may function as a general storage device to perform a read or write operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the particular page to the newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 may handle instructions or commands corresponding to an inputted command from the host 102. The controller 130 may perform a foreground operation as a command operation, corresponding to a command from the host 102, such as a program operation corresponding to a write command, a read operation corresponding to a read command, an erase/discard operation corresponding to an erase/discard command and a parameter set operation corresponding to a set parameter command or a set feature command with a set command.

The controller 130 may perform a background operation on the memory device 150 through the processor 134. By way of example but not limitation, the background operation for the memory device 150 includes copying data in a memory block, among the memory blocks 152, 154, 156, and storing such data in another memory block (e.g., a garbage collection (GC) operation). The background operation may include an operation to move data stored in at least one of the memory blocks 152, 154, 156 in the memory device 150 into at least another of the memory blocks 152, 154, 156 (e.g., a wear leveling (WL) operation). During a background operation, the controller 130 may use the processor 134 for storing the map data stored in the controller 130 to at least one of the memory blocks 152, 154, 156, e.g., a map flush operation. A bad block management operation of checking for bad blocks among the plurality of memory blocks 152, 154, 156 is another example of a background operation performed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) for connecting the controller 130 to which memory die(s) in the memory 150 is/are proper or appropriate for performing each operation. The controller 130 may transmit data or instructions via the channel(s) or way(s) for performing each operation. The plurality of memory dies may transmit an operation result via the same channel(s) or way(s), respectively, after each operation is complete. Then, the controller 130 may transmit a response or an acknowledge signal to the host 102. In an embodiment, the controller 130 may check a status of each channel or each way. In response to a command received from the host 102, the controller 130 may select at least one channel or way based on the status of each channel or each way so that instructions and/or operation results with data may be delivered via selected channel(s) or way(s).

The controller 130 may check the states of a plurality of channels (or ways) coupled to a plurality of memory dies that are included in the memory device 150. According to an embodiment, the controller 130 may check the states of a plurality of channels (or ways) coupled to a plurality of memory dies through the monitoring circuitry 197, which is described above with reference to FIG. 1A.

By way of example but not limitation, the controller 130 may recognize statuses regarding channels (or ways) associated with memory dies in the memory device 150. The controller 130 may determine each channel or each way as being in a busy state, a ready state, an active state, an idle state, a normal state, or an abnormal state. The controller's determination of which channel or way an instruction (and/or a data) is delivered through can be based on a physical block address, e.g., to which die(s) the instruction (and/or the data) is delivered. The controller 130 may refer to descriptors delivered from the memory device 150. The descriptors may include a block or page of parameters that describe characteristics of the memory device 150, and may have a set format or structure. The descriptors may include device descriptors, configuration descriptors, unit descriptors, and the like. The controller 130 can refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory such as a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may substantially reduce the utilization efficiency of the memory device 150 having a 3D stack structure and the reliability of the memory system 110. Thus, reliable bad block management may enhance or improve performance of the memory system 110.

Figure 3:
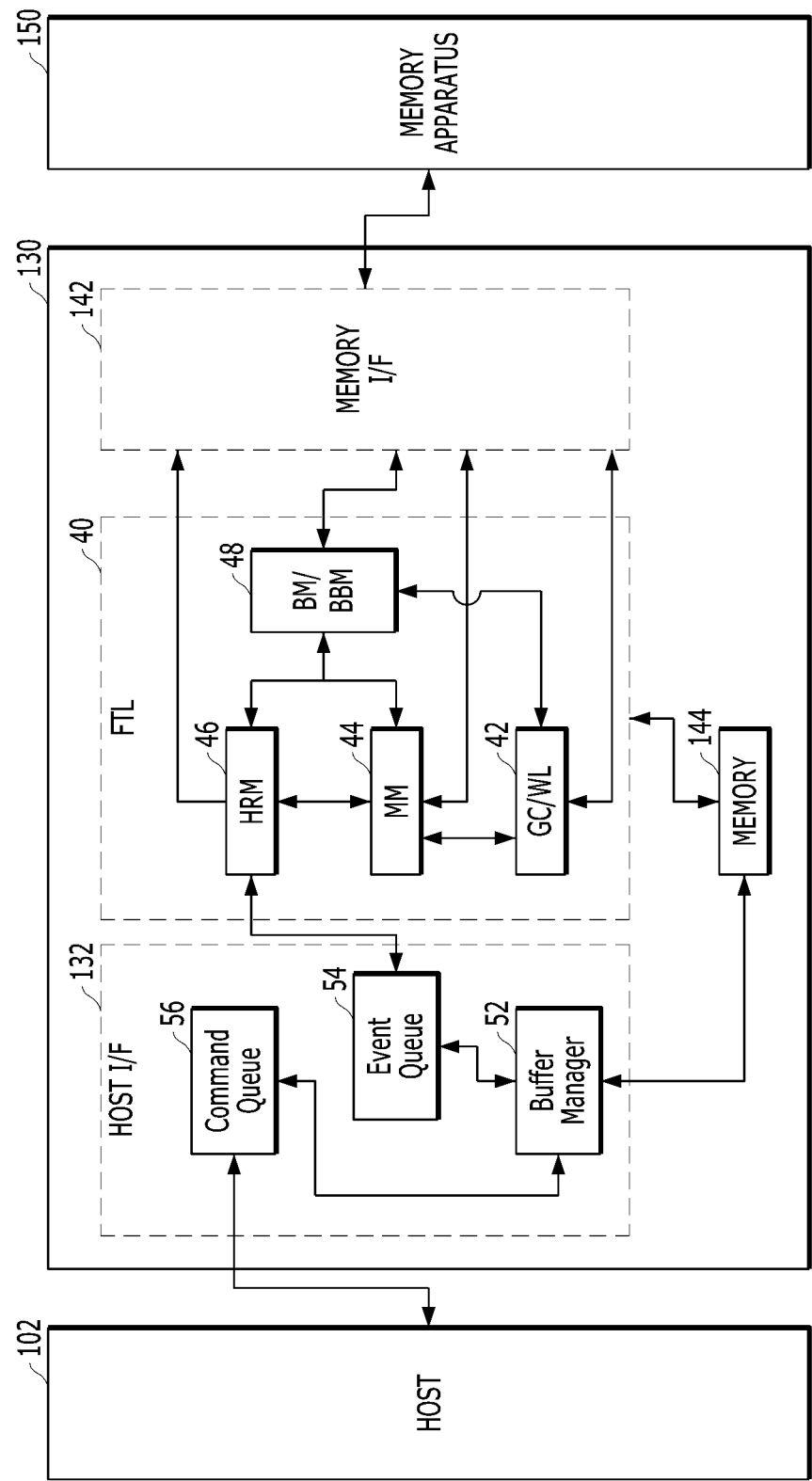
FIG. 3 is a block diagram illustrating a controller in a memory system in accordance with another embodiment of the present invention.

FIG. 3 is a block diagram illustrating a controller in a memory system in accordance with another embodiment of the present disclosure.

Referring to FIG. 3, the controller 130 cooperates with the host 102 and the memory device 150. The controller 130 may include a host interface (I/F) 132, flash translation layer (FTL) circuitry 40, a memory interface (I/F) 142 and a memory 144.

Although not shown in FIG. 3, in accordance with an embodiment, the ECC circuitry 138 in FIG. 2 may be included in the flash translation layer (FTL) circuitry 40. In another embodiment, the ECC circuitry 138 may be implemented as a separate module, a circuit, or firmware, which is included in, or associated with, the controller 130.

Also, according to an embodiment, the flash translation layer (FTL) circuitry 40 and the memory interface 142 may serve as the correlation circuitry 194, which is described above with reference to FIG. 1. According to another embodiment, the flash translation layer (FTL) circuitry 40 and the memory interface 142 may serve as the pending credit determining circuitry 195, which is described above with reference to FIG. 1. According to another embodiment, the flash translation layer (FTL) circuitry 40 and the memory interface 142 may serve as the monitoring circuitry 197, which is described above with reference to FIG. 1. According to another embodiment, the flash translation layer (FTL) circuitry 40 and the memory interface 142 may serve as the read mode selection circuitry 199, which is described above with reference to FIG. 1.

The host interface 132 may handle commands and data from the host 102. By way of example but not limitation, the host interface 132 may include a command queue 56, a buffer manager 52 and an event queue 54. The command queue 56 may sequentially store commands and data from the host 102 and output them to the buffer manager 52 in a stored order. The buffer manager 52 may classify, manage or adjust commands and data which are delivered from the command queue 56. The event queue 54 may sequentially transmit events for processing the commands and the data, from the buffer manager 52.

A plurality of commands or data having the same characteristics may be sequentially received from the host 102, or commands and data having different characteristics may be transmitted to the memory system 110 after being mixed. For example, a plurality of read commands may be delivered, or read commands and program/write commands may be alternately transmitted to the memory system 110. The host interface 132 may sequentially store commands and data, which are received from the host 102, to the command queue 56. Thereafter, the host interface 132 may estimate or predict what kind of internal operation the controller 130 will perform according to the characteristics of the command and data which is received from the host 102. The host interface 132 may determine a processing order and a priority of commands and data, based at least on their characteristics. According to characteristics of commands and data, from the host 102, the buffer manager 52 in the host interface 132 is configured to determine whether the buffer manager 52 should store commands and data in the memory 144, or whether the buffer manager 52 should deliver the commands and the data into the flash translation layer (FTL) circuitry 40. The event queue 54 receives events, entered from the buffer manager 52, which are to be internally executed and processed by the memory system 110 or the controller 130 in response to the commands and the data from the host 102, so as to deliver the events into the flash translation layer (FTL) circuitry 40 in the order received.

In accordance with an embodiment, the host interface 132 in FIG. 3 may perform the functions of the controller 130 in FIG. 2.

In accordance with an embodiment, the flash translation layer (FTL) circuitry 40 may include a state manager (GC/WL) 42, a map manager (MM) 44, a host request manager (HRM) 46, and a block manager (BM/BBM) 48. The host request manager 46 may manage the events entered from the event queue 54. The map manager 44 may handle or control map data. The state manager 42 may perform garbage collection (GC) or wear leveling (WL). The block manager 48 may execute commands or instructions onto a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map data manager 44, to determine a physical address corresponding to the logical address which is entered with the events. The host request manager 46 may send a read request with the physical address to the memory interface 142, to process the read request (handle the events). On the other hand, the host request manager 46 may send a program request (or write request) to the block manager 48, to program entered data to an empty page (i.e., a page having no data) in the memory device 150, and then, may transmit a map update request corresponding to the program request to the map manager 44, to update mapping addresses.

The block manager 48 may convert a program request delivered from the host request manager 46, the map data manager 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multi-plane and one-shot program operations to the memory interface 142. The block manager 48 may send several flash program requests to the memory interface 142 to enhance or maximize parallel processing of the multi-channel and multi-directional flash controller.

The block manager 48 may be configured to manage blocks in the memory device 150 according to the number of valid pages, select and erase blocks having no valid pages when a free block is needed, and select a block including the least number of valid pages when it is determined that garbage collection is necessary. The state manager 42 may perform garbage collection to move the valid data to an empty block and erase remaining data in the blocks from which the valid data was moved so that the block manager 48 may have enough free blocks. If the block manager 48 provides information regarding a block to be erased to the state manager 42, the state manager 42 is able to check all flash pages of the block to be erased to determine whether each page is valid. To determine validity of each page, the state manager 42 may identify a logical address stored in an out-of-band (OOB) area of each page. To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

When garbage collection is performed, the state manager 42 copies valid page(s) into a free block, and the host request manager 46 may program the latest version of the data for the same logical address of the page and issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. The map manager 44 may perform a map update operation to ensure accuracy only if the latest map table still points to an old physical address.

The memory device 150 may include a plurality of memory blocks. Each of the plurality of memory blocks may be a single level cell (SLC) memory block or a multi level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a larger storage capacity for the same space compared to the SLC memory block. The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block and a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5 or more bits of data.

In an embodiment of the disclosure, the memory device 150 is a nonvolatile memory such as a flash memory such as a NAND flash memory, a NOR flash memory and the like. In another embodiment, the memory device 150 may be at least one of a phase change random access memory (PCRAM), a ferroelectric random access memory (FRAM) and a spin injection magnetic memory (e.g., a spin transfer torque magnetic random access memory (STT-MRAM)).

Figure 4:
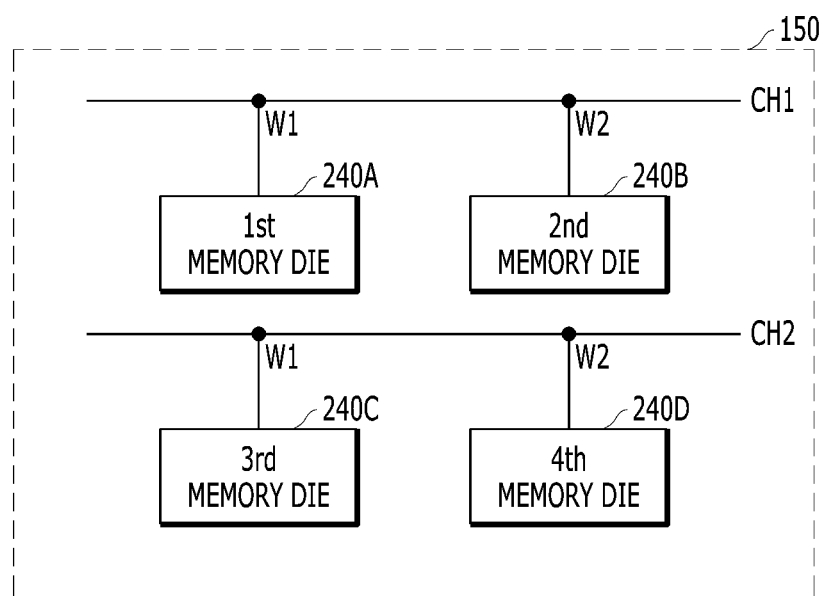
FIG. 4 is a block diagram illustrating an internal structure of a memory device.

FIG. 4 is a block diagram illustrating an internal structure of a memory device. More specifically, FIG. 4 illustrates an internal configuration of the memory device 150.

Referring to FIG. 4, the memory device 150 may include the plurality of memory dies 240A, 240B, 240C, 240D. The first memory die 240A and the second memory die 240B may be connected to the controller 130 (see FIGS. 1 through 3) through the first channel CH #1. The third memory die 240C and the fourth memory die 240D may be connected to the controller 130 through the second channel CH #2.

FIG. 4 shows a configuration in which four memory dies 240A, 240B, 240C, 240D are coupled to the controller 130 through two channels CH #1, CH #2. However, embodiments are not limited that or any particular configuration of dies and channels. Even though the memory device 150 may include at least two dies and at least two channels, the number of dies and channels in a given configuration depends on various factors, such as the overall configuration of the memory system, the purpose(s) for which it is employed and the specification defining communication between the memory system and the engaged host.

When a plurality of memory dies is connected to a single channel, each memory die may be coupled with the channel through different ways. In FIG. 4, the first memory die 240A and the second memory die 240B may be coupled with the first channel CH #1 through the first way W1 and the second way W2, respectively. The third memory die 240C and the fourth memory die 240D may be coupled with the second channel CH #2 through the first way W1 and the second way W2, respectively. In this particular configuration, the number of ways is the same as the number of memory dies.

Figure 5A:
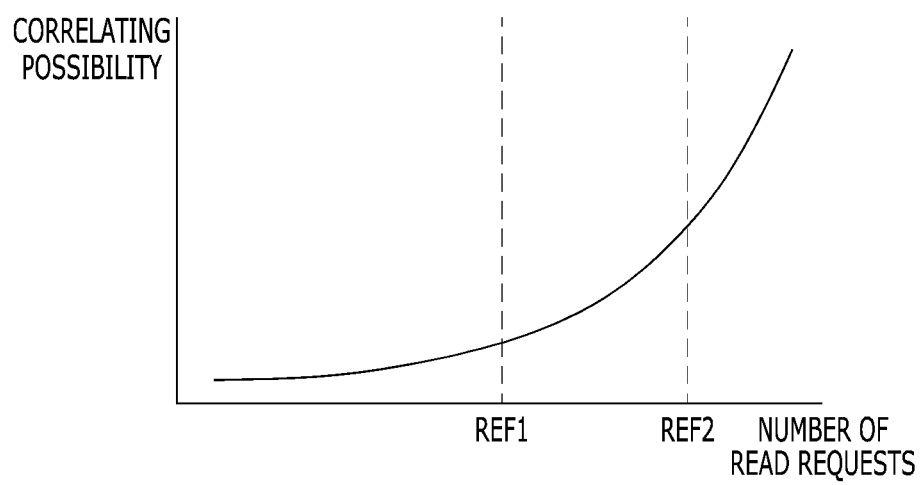
FIG. 5A and FIG. 5B illustrate characteristics of a correlation operation performed by a controller.
Figure 5B:
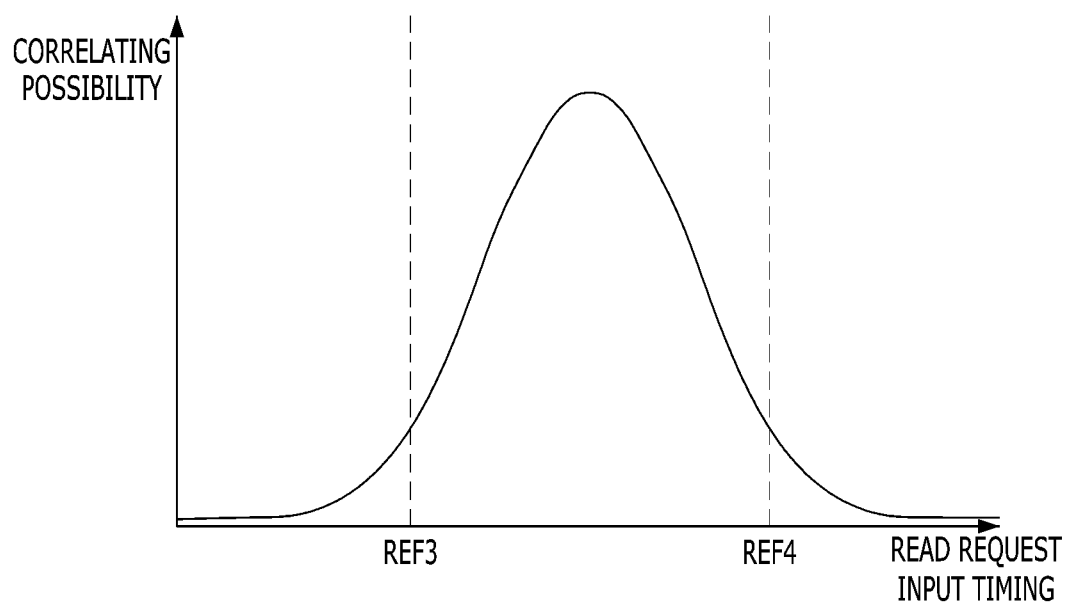

FIG. 5A and FIG. 5B illustrate characteristics of a correlation operation performed by the controller. Specifically, the two graphs in FIG. 5A and FIG. 5B illustrate results obtained by performing correlation operations repeatedly as described below.

Referring to FIG. 5A, as the correlation circuitry 194 in the controller 130 of FIG. 1 attempts to establish correlations for an increasing number of read requests, a probability of correlating such read requests increases as the number of read requests increase. For example, the probability of finding a correlation within 20 read requests is greater than that of 5 read requests.

When there is no address limitation in a memory system, physical locations in the memory device 150 corresponding to logical addresses delivered with a few read requests may not be distributed. In this case, the number of read requests correlated by the correlation circuitry 194 may be small. However, when a large number of read requests are transmitted to the memory system 110, the probability that the read requests are correlated is higher. For example, the probability of correlation may be higher when the number of read requests is the second reference value REF2 compared to when the number of read requests is the first reference value REF1, which is less than REF2.

Referring to FIG. 5B, when a plurality of read requests are sequentially transmitted to the correlation circuitry 194, the probability of correlation according to an input time (or input sequence) of the read requests is described. As described with reference to FIG. 4, it is assumed that there are two channels between the controller 130 and the memory device 150 in the memory system 110. For example, a first read request sent to the correlation circuitry 194 may not be correlated because there are no other read requests which are ready to be correlated. When a second read request is delivered to the correlation circuitry 194, the second read request may or may not be correlated with the base read request; the probability of such correlation is 50:50. When a third read request is delivered to the correlation circuitry 194, the correlation circuitry 194 may attempt to correlate the third read request with the previous read requests if they are not correlated. Thus, the probability of correlation may be higher when the third read request is delivered than when the second read request is delivered. Based on these characteristics, the correlation circuitry 194 may determine the correlation state, i.e., whether or not to attempt to perform a correlation operation, before and after a specific read request is received. For example, after a read request (corresponding to third reference value REF3) is received, the correlation circuitry 194 may determine that a probability of correlation is sufficiently high, and attempt to perform the correlation operation on the previously-received read request(s) together with the (REF3) read request. In contrast, before the (REF3) read request is received, the correlation circuitry 194 may determine that a probability of correlation is too low, and thus skip performing the correlation operation on the read requests received before the REF3 read request.

In another example, it is assumed that 20 read requests are delivered. When the 19th and 20th read requests are inputted, the probability of correlation may be lower when the 9th to 11th read requests are inputted. This is because, when the 19th and 20th read requests are inputted, the previously inputted 1st to 18th read requests read requests may have been already correlated and outputted to the operation control circuitry 196. As the correlated read requests are transferred over time, the probability of correlation may be lowered. In order to avoid the correlation circuitry 194 wasting resources such as time, overhead, or power to perform the correlation operation, the correlation operation may be stopped at a time when the read request corresponding to a fourth reference value REF4 is transmitted.

In an embodiment, the correlation circuitry 194 may stop the correlation operation in response to a particular number of uncorrelated read requests. For example, if a small number of uncorrelated read requests, e.g., two or three, remain, among the 20 read requests, the correlation circuitry 194 may output the uncorrelated read requests to the operation control circuitry 196 without holding them for a next correlation operation. When the correlation circuitry 194 holds a few read requests for performing a next correlation operation, the data input/output performance (e.g., I/O throughput) of the memory system 110 may be deteriorated.

As shown in FIG. 5B, if the correlation circuitry 194 determines whether to perform a correlation operation using only the number of read requests received from the I/O buffer control circuitry 198 as a reference REF3 or REF4, the accuracy or efficiency of an operation of determining whether to perform a correlation operation may be reduced. For example, if success of a correlation operation occurs more frequently than a predicted probability, all read requests corresponding to a predicted number may be processed within a time shorter than a predicted time, and the correlation circuitry 194 may then enter an idle state. In contrast, if failure of a correlation operation occurs more frequently than a predicted probability, all read requests corresponding to a predicted number may not be processed within a predicted time, and data I/O throughput may be adversely affected due to the delay of an operation of the correlation circuitry 194. Furthermore, if success of a correlation operation is repeated with respect to only specific memory dies of the multiple memory dies 240A, 240B, 240C, and 240D, the remaining memory dies that are not a target of the correlation operation (or on which the correlation operation has failed) may remain in an idle state (although a corresponding read request is present) due to a policy for preferentially processing a read request on which a correlation operation has been successful.

In order to solve such a problem, when a candidate read request to be transmitted from the I/O buffer control circuitry 198 to the correlation circuitry 194 is selected, the pending credit determining circuitry 195 may check, from the correlation circuitry 194, whether a previous correlation operation has been performed by the correlation circuitry 194 prior to selection timing at which the candidate read request is selected and whether an executed correlation operation is successful if the correlation operation has been performed, may identify the operating states of the multiple memory dies 240A, 240B, 240C, and 240D at the selection timing from the monitoring circuitry 197, may collect the results of the identification, and then may convert the collected results into a numerical value called a pending credit. Next, the correlation circuitry 194 may determine whether to perform a correlation operation on the candidate read request, selected and input at the selection timing, based on the pending credit determined at the selection timing.

Figure 6:
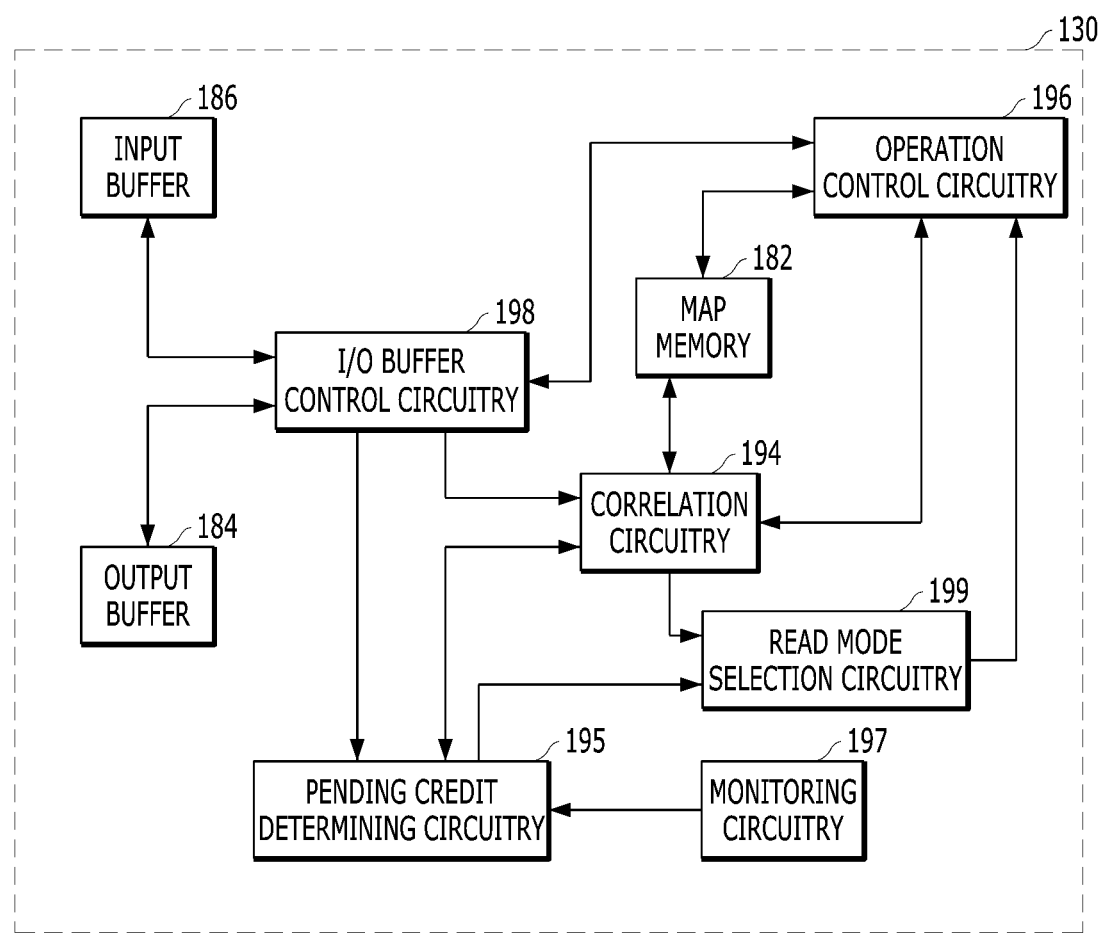
FIG. 6 is a block diagram illustrating an internal structure of the controller.

FIG. 6 is a block diagram illustrating an internal structure of the controller.

Referring to FIG. 6, the controller 130 may include an input buffer 186, an output buffer 184, the I/O buffer control circuitry 198, the correlation circuitry 194, the pending credit determining circuitry 195, the monitoring circuitry 197, a map memory 182, the operation control circuitry 196, and the read mode selection circuitry 199. For example, the I/O buffer control circuitry 198, the correlation circuitry 194 and the operation control circuitry 196 may determine the execution or stop of a correlation operation while operating in conjunction with the output buffer 186, the input buffer 184, the pending credit determining circuitry 195, the monitoring circuitry 197 and the map memory 182. Furthermore, the correlation circuitry 194, the operation control circuitry 196 and the pending credit determining circuitry 195 may select whether to read additional data related to target data when reading the target data corresponding to a read request, while operating in conjunction with the read mode selection circuitry 199.

In some embodiments, the output buffer 186, the input buffer 184 and the map memory 182 may be functionally separate components, and may be implemented within the memory 144 described with reference to FIGS. 2 and 3. Furthermore, in some embodiments, the output buffer 186, the input buffer 184 and the map memory 182 may be implemented as multiple non-volatile memory apparatuses or multiple cache memories.

For example, the output buffer 186 and the input buffer 184 may have a data structure, such as a queue. In this case, the output buffer 186 and the input buffer 184 may output data in stored order (FIFO). The map memory 182 may have various structures depending on a storage or management policy of map data or map information.

The controller 130 may translate a logical address, that is, an address received from the host 102 (refer to FIGS. 2 and 3), into a physical address indicative of a physical location within the memory apparatus 150 (refer to FIGS. 1 to 4). For the address translation, the controller 130 may load map data or map information stored in the memory apparatus 150.

In some embodiments, if the storage space of the memory 144 (refer to FIGS. 2 and 3) included in the controller 130 or operating in conjunction with the controller 130 is sufficient, all map data or map information used for address translation may be invoked at a time. However, in the case of the memory system 110 (refer to FIGS. 1 to 3) mounted on a portable terminal, etc., it may be difficult for the controller 130 to have a sufficient storage space capable of storing all map data or map information. In this case, the controller 130 may use a space for storing map data or map information within the memory 144 in such a way to invoke specific map information from the memory apparatus 150, use or update the specific map information, store the specific map information in the memory apparatus 150, and invoke another piece of map information stored in the memory apparatus 150.

If requested map data cannot be stored in a region within the memory 144, the controller 130 may remove the least recently used map data within the region. Furthermore, for another example, if requested map data cannot be stored in a region within the memory 144, the controller 130 may remove the least frequently used map data within the region. The controller 130 may request map data or map information for address translation from the memory apparatus 150, but this may be overhead for overall performance or I/O throughput of the memory system 110. Accordingly, it is necessary to allow the controller 130 not to request unnecessary map data or map information.

For example, it is assumed that the number of read requests input from the host 102 (refer to FIGS. 2 and 3) for correlation operation is 20. As a result of checking the map memory 182 based on a logical address related to the 20 read requests, map data or map addresses for 11 read requests may be present in the map memory 182, and map data or map addresses for 9 read requests may not be present in the map memory 182. In this case, the controller 130 may load the map data or map addresses for the 9 read requests onto the map memory 182. In some embodiments, if the storage space of the map memory 182 is not sufficient, the correlation circuitry 194 may first perform a correlation operation on a read request whose map address can be identified.

The correlation operation performed by the correlation circuitry 194 may be recognized as overhead from the point of view of I/O throughput of the memory system 110 (refer to FIGS. 1 to 3). Accordingly, it may be more preferred to allow the operation control circuitry 196 to be in an active state, rather than have the correlation circuitry 194 perform the correlation operation on all of transmitted read requests performed.

Accordingly, the correlation circuitry 194 may determine whether to perform a correlation operation on a candidate read request that is selected at selection timing and received from the I/O buffer control circuitry 198 based on a pending credit determined at the selection timing at which the I/O buffer control circuitry 198 selects the candidate read request and the type of data corresponding to the candidate read request. For example, if the data of a candidate read request selected by the I/O buffer control circuitry 198 is data for which read has been requested through an internal operation of the controller 130 or random read data requested by the host 102, when a pending credit determined at selection timing at which the I/O buffer control circuitry 198 selects the candidate read request is a reference value or more, the correlation circuitry 194 may perform a correlation operation on the candidate read request that is selected at the selection timing and received from the I/O buffer control circuitry 198. Furthermore, if the data of a candidate read request selected by the I/O buffer control circuitry 198 is data that is read-requested through an internal operation of the controller 130 or random data that is read-requested by the host 102, when a pending credit determined at selection timing at which the I/O buffer control circuitry 198 selects the candidate read request is less than a reference value, the correlation circuitry 194 may not perform a correlation operation on the candidate read request that is selected at the selection timing and received from the I/O buffer control circuitry 198. Furthermore, if the data of a candidate read request selected by the I/O buffer control circuitry 198 is sequential data that is read-requested by the host 102, the correlation circuitry 194 may not perform a correlation operation on the candidate read request that is selected at selection timing and received from the I/O buffer control circuitry 198, regardless of a value of a pending credit determined at the selection timing at which the I/O buffer control circuitry 198 selects the candidate read request. For reference, examples of data for which read has been requested through an internal operation of the controller 130 includes map data read from the memory apparatus 150 to the map memory 182, data read from the memory apparatus 150 for a garbage collection operation, data read from the memory apparatus 150 for a read reclaim operation, or data read from the memory apparatus 150 for a wear leveling operation.

In this case, the pending credit determining circuitry 195 may determine a pending credit by checking whether a previous correlation operation has been performed by the correlation circuitry 194 prior to selection timing at which a candidate read request to be transmitted from the I/O buffer control circuitry 198 to the correlation circuitry 194 is selected.

Specifically, the pending credit determining circuitry 195 may increase a pending credit in response to the processing of a candidate read request without a correlation operation prior to selection timing at which the I/O buffer control circuitry 198 selects the candidate read request. More specifically, the pending credit determining circuitry 195 may increment a pending credit based on an expected processing time of a candidate read request processed without a correlation operation prior to selection timing at which the I/O buffer control circuitry 198 selects the candidate read request. For example, if an expected processing time of a candidate read request processed without a correlation operation is 50 us, the pending credit determining circuitry 195 may determine a pending credit by increasing the current pending credit by 5. Furthermore, if an expected processing time of a candidate read request processed without a correlation operation is 10 us, the pending credit determining circuitry 195 may determine a pending credit by increasing the current pending credit by 1. For reference, a case where a candidate read request is processed without a correlation operation may be a case where a pending credit determined by the pending credit determining circuitry 195 is less than a reference value at selection timing at which the I/O buffer control circuitry 198 selects the candidate read request. Furthermore, two different read requests may have different expected processing times due to circumstances, e.g., because the sizes of data to be read from the memory apparatus 150 in response to the read requests are different. In this case, the expected processing time corresponding to the read request can also be predicted because the size of the data read from the memory apparatus 150 in response to the read request is known. An expected processing time corresponding to a read request may be different depending on the type or throughput of the memory apparatus 150.

Furthermore, after a previous correlation operation is performed prior to selection timing at which a candidate read request to be transmitted from the I/O buffer control circuitry 198 to the correlation circuitry 194 is selected, the pending credit determining circuitry 195 may determine a pending credit by checking, from the correlation circuitry 194, whether the executed correlation operation has been successful.

Specifically, the pending credit determining circuitry 195 may increase the pending credit based on the success of the previous correlation operation executed by the correlation circuitry 194 prior to the selection timing at which the I/O buffer control circuitry 198 selects the candidate read request, and may decrease the pending credit based on the failure of the correlation operation. More specifically, the pending credit determining circuitry 195 may increment the pending credit based on the time expected to be shortened due to the success of the previous correlation operation executed by the correlation circuitry 194 prior to the selection timing at which the I/O buffer control circuitry 198 selects the candidate read request. Furthermore, the pending credit determining circuitry 195 may decrement the pending credit based on the time consumed due to the failure of the previous correlation operation executed by the correlation circuitry 194 prior to the selection timing at which the I/O buffer control circuitry 198 selects the candidate read request. For example, if the time expected to be shortened due to the success of the correlation operation executed by the correlation circuitry 194 is 30 us, the pending credit determining circuitry 195 may determine the pending credit by increasing the current pending credit by 3. Furthermore, if the time consumed due to the failure of the correlation operation executed by the correlation circuitry 194 is 20 us, the pending credit determining circuitry 195 may determine the pending credit by decreasing the current pending credit by 2. For reference, the reason why the time can be reduced due to the success of a correlation operation is that, if the correlation operation is successful, at least two read requests can be processed at a time in an interleaving manner and less time is used compared to a case where the at least two read requests are independently processed without a correlation operation. That is, a difference between the time expected to be used to process at least two read requests independently without a correlation operation and the time expected to be used to process at least two read operations in an interleaving manner as a result of a successful correlation operation may be the time saved due to the success of the correlation operation. Furthermore, if the correlation operation has failed, time is used to check the failure of the correlation operation after the correlation operation is performed, but as a result, a read request is processed the same as when the correlation operation is not performed. That is, the time taken to perform a failed correlation operation represents additional time in the processing of that read request.

Furthermore, the pending credit determining circuitry 195 may determine a pending credit by identifying, from the monitoring circuitry 197, the operating states of the multiple memory dies 240A, 240B, 240C, and 240D at selection timing at which a candidate read request to be transmitted from the I/O buffer control circuitry 198 to the correlation circuitry 194 is selected.

Specifically, the pending credit determining circuitry 195 may decrease a pending credit when at least one of the multiple memory dies 240A, 240B, 240C, and 240D is an idle state at selection timing at which the I/O buffer control circuitry 198 selects a candidate read request. More specifically, the pending credit determining circuitry 195 may decrement the pending credit based on the number of memory dies that are in the idle state at the selection timing at which the I/O buffer control circuitry 198 selects the candidate read request. For example, if the number of memory dies in the idle state at the selection timing is 1, the pending credit determining circuitry 195 may determine the pending credit by decreasing the current pending credit by 2. Furthermore, if the number of memory dies in the idle state at the selection timing is 2, the pending credit determining circuitry 195 may determine the pending credit by decreasing the current pending credit by 4.

Furthermore, after the correlation circuitry 194 determines whether to perform a correlation operation based on a pending credit at selection timing at which the I/O buffer control circuitry 198 selects a candidate read request, if the I/O buffer control circuitry 198 does not select the candidate read request for a reference time or more, the pending credit determining circuitry 195 may reset the pending credit to an initial value. That is, if a correlation operation performed by the correlation circuitry 194 is not sequential for a reference time or more, the pending credit determining circuitry 195 may reset a pending credit to an initial value. In this case, the initial value of the pending credit may be smaller than a reference value of the pending credit that is used as a reference when the correlation circuitry 194 determines whether to perform a correlation operation. For reference, the reference time may be set such that it represents the time between two read requests that are determined to be not sequential to each other. For example, the reference time may be the time consumed until a read request is transmitted to multiple memory dies and the processing of the read request is completed after a correlation operation is successfully performed on the read request. Separately from a correlation operation performed by the correlation circuitry 194, the controller 130 may read, from the multiple memory dies 240A, 240B, 240C, and 240D, target data corresponding to a read request and additional data stored in the same storage unit as the target data, based on the type of target data corresponding to the read request and a pending credit determined by the pending credit determining circuitry 195. That is, separately from the execution of a correlation operation, on at least some candidate read requests of a plurality of base read requests received from the host or generated within the controller through the correlation circuitry 194, the controller 130 may perform an operation of reading, from the multiple memory dies 240A, 240B, 240C, and 240D, target data corresponding to the candidate read requests and additional data stored in the same storage unit as the target data through the read mode selection circuitry 199.

In this case, as illustrated in FIG. 1B, each of the multiple memory dies 240A, 240B, 240C, and 240D may include the pages PAGE0, PAGE1, PAGE2, . . . each including a set number of sections, e.g., SECTION0, SECTION1, SECTION2, and SECTION3, the multiple blocks BLOCK000, BLOCK001, BLOCK002, . . . , BLOCK010, BLOCK011, BLOCK012, . . . each including the pages PAGE0, PAGE1, PAGE2, . . . , and the page buffers PB000, PB001, PB002, . . . , PB010, PB011, PB012, . . . for caching data input to or output from the blocks in certain units. That is, each of the multiple memory dies 240A, 240B, 240C, and 240D may output data cached in the page buffers PB000, PB001, PB002, . . . , PB010, PB011, PB012, . . . , in units of sections or in units of pages in response to a read request.

Accordingly, if a candidate read request is directed to data in a section, when the controller 130 processes the candidate read request, the controller 130 may read, from the multiple memory dies 240A, 240B, 240C, and 240D, target data stored in a requested section corresponding to the candidate read request and may also read additional data stored in the same page as the target data together, based on the type of target data corresponding to the candidate read request and a pending credit determined by the pending credit determining circuitry 195 at the processing timing of the candidate read request. In this case, the type of target data may indicate whether the target data is sequential data that is read-requested through an internal operation of the controller 130, random data that is read-requested through an internal operation of the controller 130 or data that is read-requested by the host 102.

Specifically, if a candidate read request is a read request of a section unit through the read mode selection circuitry 199 and target data corresponding to the candidate read request is sequential data for which read has been requested through an internal operation of the controller 130, when a pending credit determined by the pending credit determining circuitry 195 at processing timing at which the candidate read request is a reference value or more, the controller 130 may read, from the multiple memory dies 240A, 240B, 240C, and 240D, the target data corresponding to the candidate read request and additional data stored in the same page as the target data together. Furthermore, if a candidate read request is a read request of a section unit through the read mode selection circuitry 199 and target data corresponding to the candidate read request is sequential data for which read has been requested through an internal operation of the controller 130, when a pending credit determined by the pending credit determining circuitry 195 at processing timing at which the candidate read request is less than a reference value, the controller 130 may select only the target data corresponding to the candidate read request, and may read the selected target data from the multiple memory dies 240A, 240B, 240C, and 240D (a second read mode CASE2). Furthermore, if a candidate read request is a read request of a section unit through the read mode selection circuitry 199 and target data corresponding to the candidate read request is random data for which read has been requested through an internal operation of the controller 130 or data that is read-requested by the host, the controller 130 may select only the target data corresponding to the candidate read request regardless of a pending credit determined by the pending credit determining circuitry 195, and may read the selected target data from the multiple memory dies 240A, 240B, 240C, and 240D (a first read mode CASE1). The first and second read modes CASE1 and CASE2 are described in more detail with reference to FIG. 10.

Furthermore, a pending credit reference value of the pending credit determining circuitry 195, that is, a criterion by which the correlation circuitry 194 determines whether to perform a correlation operation on a read request, and a pending credit reference value of the pending credit determining circuitry 195, that is, a criterion by which the read mode selection circuitry 199 determines whether to read additional data along with target data corresponding to a read request, may be different. For example, assuming that a pending credit reference value of the pending credit determining circuitry 195, that is, a criterion by which the read mode selection circuitry 199 determines whether to read additional data along with target data corresponding to a read request, is a first reference value and a pending credit reference value of the pending credit determining circuitry 195, that is, a criterion by which the correlation circuitry 194 determines whether to perform a correlation operation on a read request, is a second reference value, the first reference value and the second reference value may be equal or different. Furthermore, the first reference value may be greater or smaller than the second reference value. In this case, as in the aforementioned description, it is assumed that the read mode selection circuitry 199 selects a read mode with respect to a read request transmitted from the correlation circuitry 194 to the operation control circuitry 196 when an operation margin is sufficient to the extent that the correlation circuitry 194 can smoothly perform a correlation operation. Accordingly, the first reference value may be equal to or greater than the second reference value.

Figure 7:
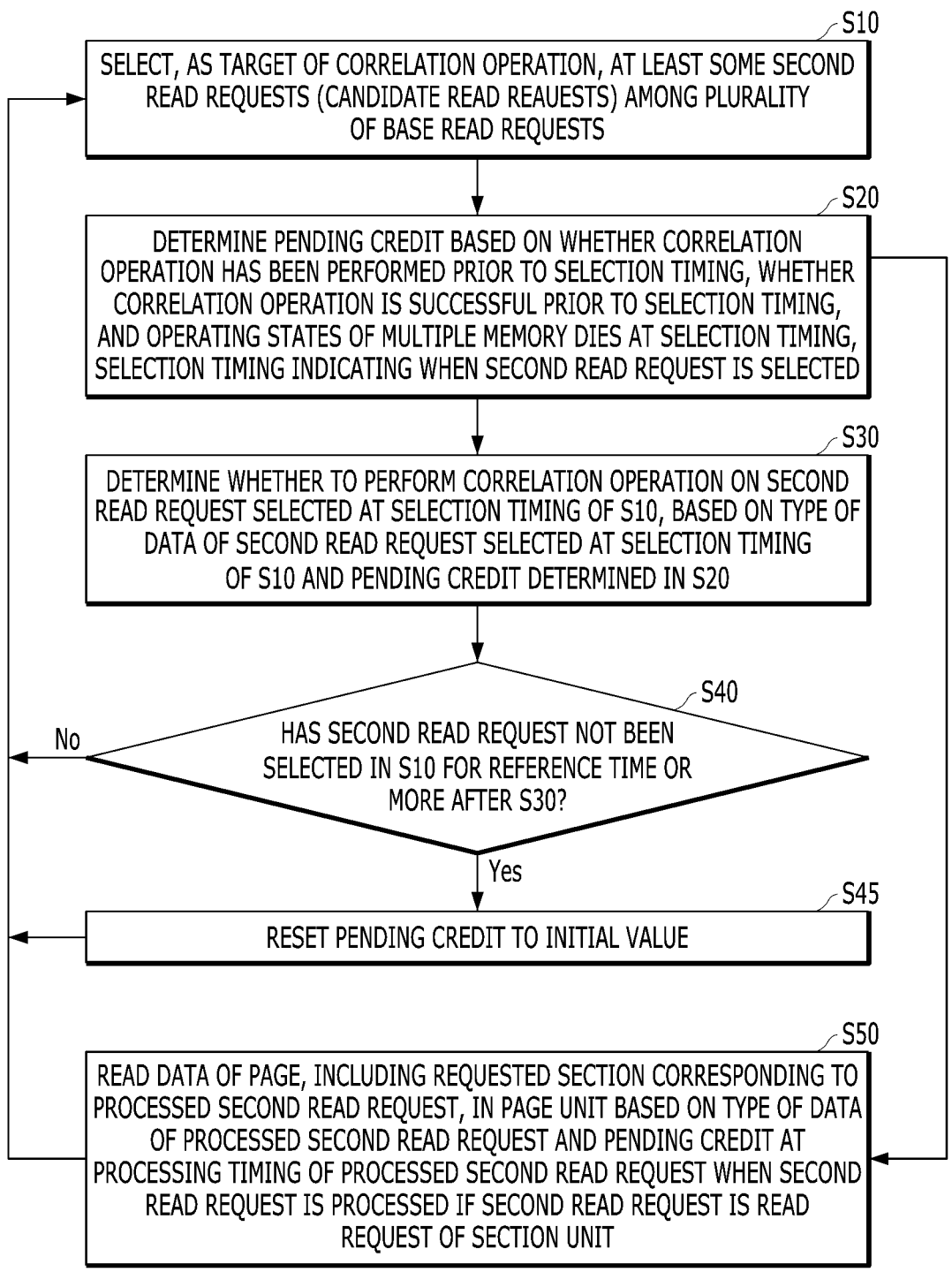
FIGS. 7 to 9 are flowcharts describing an example of a method for operating a memory system.
Figure 8:
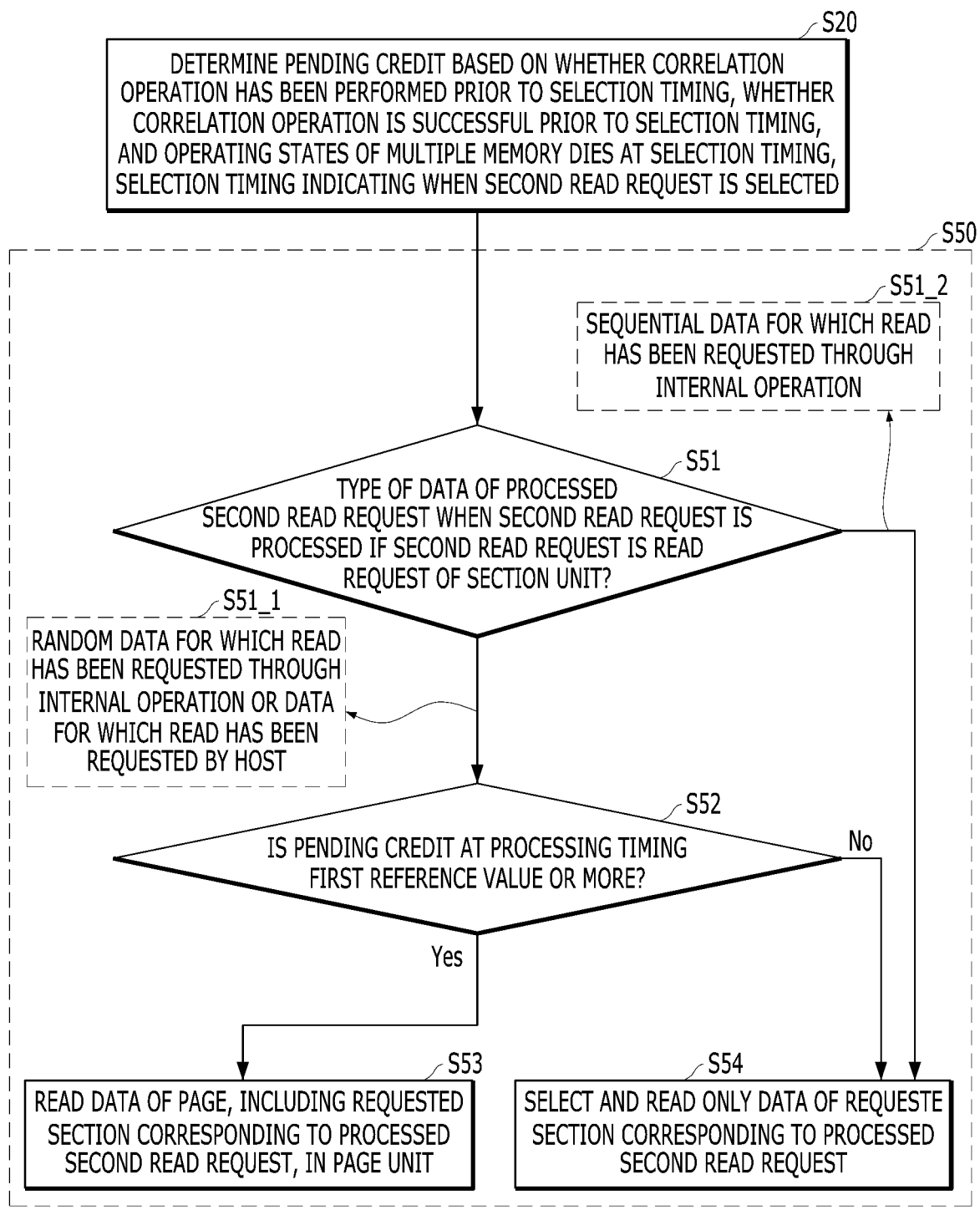
Figure 9:
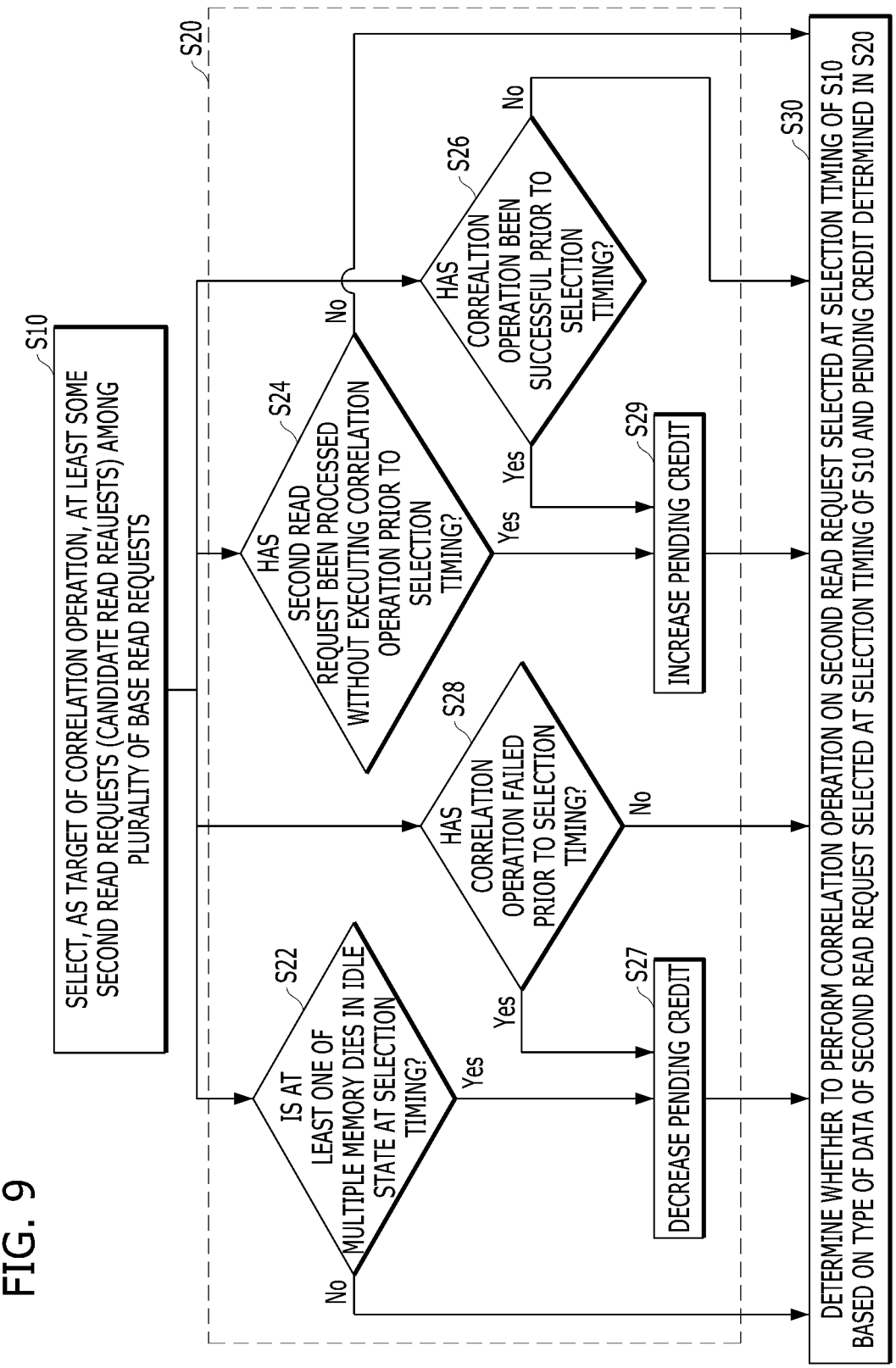

FIGS. 7 to 9 are flowcharts describing a first example of a method for operating a memory system.

First, referring to FIG. 7, the operating method may include the execution and determination steps S10, S20, S30, S40, and S45 of performing a correlation operation on a read request so that the multiple memory dies 240A, 240B, 240C, and 240D (refer to FIG. 1) interleave and output data corresponding to the read request through multiple channels and determining a pending credit into which the results of the correlation operation have been incorporated and the selection and read step S50 of reading, from the multiple memory dies, target data corresponding to the read request and additional data stored in the same storage unit as the target data based on the type of target data corresponding to the read request and the pending credit. In this case, the execution and determination steps S10, S20, S30, S40, and S45 may include the selection step S10 of selecting, as a target of a correlation operation, at least some candidate read requests among a plurality of base read requests, the determination step S20 of determining a pending credit based on whether a previous correlation operation has been performed prior to selection timing at which the candidate read request is selected in the selection step S10, whether the previous correlation operation was successful prior to the selection timing, and operating states of the multiple memory dies at the selection timing, the execution step S30 of determining whether to perform a correlation operation on the candidate read request selected at the selection timing at the selection step S10 based on the type of data of the candidate read request selected at the selection timing at the selection step S10 and the pending credit determined in the determination step S20, and the reset steps S40 and S45 of resetting the pending credit to an initial value when a candidate read request is not selected in the selection step S10 for a reference time or more after whether to perform the correlation operation is determined in the execution step S30. In this case, the reset steps S40 and S45 may include the check step S40 of checking whether the candidate read request has been selected in the selection step S10 for the reference time or more after whether to perform the correlation operation is determined in the execution step S30 and the step (YES or NO) of selecting whether to reset the pending credit based on a result of the check step S40. That is, if the result of the check step S40 (YES) indicates that the candidate read request is not selected for the reference time or more, the pending credit may be reset (S45). After the reset S45 of the pending credit, the execution and determination steps S10, S20, S30, S40, and S45 may be repeatedly performed while the selection step S10 of selecting a candidate read request again is performed. In contrast, if the result of the check step S40 (NO) indicates that the candidate read request is selected within the reference time, this corresponds to a case where the selection step S10 is performed within the reference time after the check step S40, and thus the selection step S10 may be performed after the check step S40. In this case, an initial value of the pending credit may be smaller than a reference value of the pending credit, that is, a criterion for determining whether to perform a correlation operation in the determination step S20. That is, after the pending credit is reset to an initial value through the reset steps S40 and S45, a candidate read request first selected in the selection step S10 will not be correlated in the execution step S30 because the pending credit of the candidate read request starts from an initial value.

Furthermore, as illustrated in FIG. 1B, it may be assumed that each of the multiple memory dies 240A, 240B, 240C, and 240D includes the pages PAGE0, PAGE1, PAGE2, . . . each including the sections SECTION0, SECTION1, SECTION2, and SECTION3 corresponding to a set number, the multiple blocks BLOCK000, BLOCK001, BLOCK002, . . . , BLOCK010, BLOCK011, BLOCK012, . . . each including the pages PAGE0, PAGE1, PAGE2, . . . , and the page buffers PB000, PB001, PB002, . . . , PB010, PB011, PB012, . . . for caching data input to or output from the blocks BLOCK000, BLOCK001, BLOCK002, . . . , BLOCK010, BLOCK011, BLOCK012, . . . in page units.

In such a case, in the selection and read step S50, if the candidate read request selected in the selection step S10 is a read request of a section unit, the data of a page including a requested section corresponding to the candidate read request may be read in a page unit based on the type of data of a processed candidate read request when the candidate read request is processed and a pending credit at the processing timing of the processed candidate read request. In this case, the selection and read step S50 may not be directly associated with the execution and determination steps S10, S20, S30, S40, and S45, except that the selection and read step S50 operates based on a pending credit and starts to operate again when another candidate read request is selected in the selection step S10 after the operation. Accordingly, the remaining operations S30, S40, and S45 of the execution and determination steps S10, S20, S30, S40, and S45 except the selection step S10 and the determination step S20 may not be directly associated with the operation of the selection and read step S50.

Specifically, referring to FIG. 8, the selection and read step S50 may include the data identification step S51 of identifying the type of data of a processed candidate read request when the candidate read request is processed if the candidate read request selected in the selection step S10 is a read request of a section unit, the reference check step S52 of checking whether a pending credit at timing at which the candidate read request is processed is a reference value or more if the data of the processed candidate read request is identified in the data identification step S51 as sequential data that is read-requested through an internal operation of the controller 130 (S51_1), the first read step S53 of reading the data of a page, including a requested section corresponding to the candidate read request, in a page unit if the result of the reference check step S52 (YES) indicates that the pending credit at the timing at which the candidate read request is processed is the reference value or more, and the second read step S54 of selecting and reading only the data of a requested section corresponding to the candidate read request when the data of the processed candidate read request is identified in the data identification step S51 as random data that is read-requested through an internal operation of the controller 130 or data that is read-requested by the host 102 (S51_2) or the result of the reference check step S52 (NO) indicates that the pending credit at the timing at which the candidate read request is processed is less than the reference value.

Although not directly illustrated in this drawing, if a correlation operation is performed on the candidate read request, selected in the selection step S10, in the execution step S30, the operating method of the memory system may further include the first transmission step of identifying a target address for a read request correlated based on the success of the correlation operation and then transmitting the read request to the multiple memory dies through multiple channels, the first reception step of receiving the data of the correlated read request in an interleaving manner through the multiple channels after the first transmission step, the second transmission step of identifying a target address for a read request not correlated due to the failure of the correlation operation and then transmitting the read request to the multiple memory dies, the second reception step of reading data corresponding to the non-correlated read request from the multiple memory dies after the second transmission step, and the step of outputting, to a host, the data received in the first or second reception step. In this case, I/O throughput of the memory system 110 can be improved by transmitting the read request, correlated in the first transmission step, to the multiple memory dies earlier than the read request not correlated in the second transmission step.

In the selection step S10, reference may be made to the number of base read requests received from a host, an operating state of the output buffer, etc. That is, in order to perform a correlation operation within a range in which I/O throughput of the memory system does not deteriorate, a candidate read request may be selected as a correlation operation target after an operation margin for the correlation operation is secured.

For example, for the selection step S10, whether the number of pieces of data that are to be output from the output buffer to a host is greater than a reference number may be determined. In this case, the reference number may be determined to correspond to a first data I/O speed between the host and the memory system and a second data I/O speed between the controller and the multiple memory dies. For example, it is assumed that the time taken for the memory system to transmit one piece of data to a host is 10 ms. If 10 pieces of data to be output to are included in the output buffer, the memory system may have an operation margin of 100 ms (=10×10). For example, assuming that the time taken for a read request to be transmitted and data to be received between the controller and memory apparatus of the memory system is 5 ms, the controller may attempt correlation operation for a maximum of 95 ms of the 100 ms operation margin.

The controller of the memory system may be aware of an operation speed of and required time for an internal operation, and may compute an operation margin according to a protocol with the host operating in conjunction with the memory system. Accordingly, the controller may compute and estimate an operation margin on which correlation operation may be attempted. For example, the controller may compute a maximum value of an operation margin for correlation operation, and then perform the correlation operation for a time corresponding to 70 to 90% of the maximum value. In some embodiments, a time category on which the controller may attempt correlation operation may be different. Furthermore, the controller may determine an operation margin, on which correlation operation may be attempted, in accordance with an operating environment of the memory system, an operating state of the memory apparatus, etc.

Specifically, in the determination step S20, the pending credit may be determined at selection timing at which the candidate read request is selected in the selection step S10. More specifically, referring to FIG. 9, the determination step S20 may include the first identification step S22 of identifying whether the state of at least one of the multiple memory dies is an idle state at selection timing at which the candidate read request is selected in the selection step S10, the second identification step S28 of checking whether a previous correlation operation has failed prior to the selection timing at which the candidate read request is selected in the selection step S10, the third check step S24 of checking whether the candidate read request has been processed without a correlation operation prior to the selection timing at which the candidate read request is selected in the selection step S10, the fourth check step S26 of checking whether a previous correlation operation has been successful prior to the selection timing at which the candidate read request is selected in the selection step S10, the step S27 of decreasing a pending credit if the result of the first identification step S22 (YES) indicates that the state of at least one memory die is the idle state or if the result of the second identification step S28 (YES) indicates a previous correlation operation has failed prior to the selection timing at which the candidate read request is selected in the selection step S10, and the step S29 of increasing a pending credit if the result of the third identification step S24 (YES) indicates that the candidate read request is processed without a correlation operation prior to the selection timing at which the candidate read request is selected in the selection step S10, or if the result of the fourth check step S26 (YES) indicates that a previous correlation operation has been successful prior to the selection timing at which the candidate read request is selected in the selection step S10. In this case, if the result of the first identification step S22 (NO) indicates that the states of none of the multiple memory dies are the idle state (NO) or if the result of the second identification step S28 (NO) indicates that the previous correlation operation has been successful prior to the selection timing at which the candidate read request is selected in the selection step S10, the operation of the step S27 of decreasing the pending credit may not be performed. Likewise, if the result of the third identification step S24 (YES) indicates that the candidate read request has not been processed without a correlation operation prior to the selection timing at which the candidate read request is selected in the selection step S10 or if the result of the fourth check step S26 (NO) indicates that a previous correlation operation has failed prior to the selection timing at which the candidate read request is selected in the selection step S10, the operation of the step S29 of increasing the pending credit may not be performed.

In this case, in the determination step S20, the step S27 of decreasing the pending credit and the step S29 of increasing the pending credit may operate in parallel. For example, if at least one memory die is in the idle state at the selection timing at which the candidate read request is selected in the selection step S10 and a previous correlation operation was successful prior to the selection timing, the operations of the first identification step S22 and the step S28 of decreasing the pending credit and the operations of the fourth check step S26 and the step S29 of increasing the pending credit may operate in parallel and a pending credit may be determined.

In this case, in the first identification step S22 and the step S27 of decreasing the pending credit, the pending credit may be decremented based on the number of memory dies that are in an idle state at the selection timing at which the candidate read request is selected in the selection step S10. That is, the more dies that are in the idle state at the time that the candidate read request is selected in step S10, the greater the pending credit is decreased. For example, the pending credit is decreased more when there are two dies in the idle state than when there is only one die in the idle state.

Furthermore, in the second identification step S28 and the step S27 of decreasing the pending credit, the pending credit may be decremented based on the time consumed due to the failure of a previous correlation operation performed prior to the selection timing at which the candidate read request is selected in the selection step S10. That is, the pending credit may be decreased more as the time consumed due to the failure of a previous correlation operation performed prior to the selection timing at which the candidate read request is selected in step S10 increases.

Furthermore, in the third check step S24 and the step S29 of increasing the pending credit, the pending credit may be incremented based on an expected processing time of a candidate read request processed without a correlation operation prior to the selection timing at which the candidate read request is selected in the selection step S10. That is, the pending credit may be increased more as the expected processing time of a candidate read request processed without a correlation operation prior to the selection timing at which the candidate read request is selected increases.

Furthermore, in the fourth check step S26 and the step S29 of increasing the pending credit, the pending credit may be increased based on an expected shorter processing time due to the success of a previous correlation operation performed prior to the selection timing at which the candidate read request is selected in the selection step S10. That is, the pending credit may be increased more as expected processing time becomes shorter due to the success of a previous correlation operation performed prior to the selection timing at which the candidate read request is selected in the selection step S10.

In the execution step S30, whether to perform a correlation operation on the candidate read request selected in the selection step S10 may be determined based on the pending credit determined in the determination step S20. Specifically, when the pending credit determined in the determination step S20 at the selection timing at which the candidate read request is selected in the selection step S10 is a reference value or more, in the execution step S30, a correlation operation may be performed on the candidate read request selected in the selection step S10. In contrast, when the pending credit determined in the determination step S20 at the selection timing at which the candidate read request is selected in the selection step S10 is less than the reference value, in the execution step S30, a correlation operation may not be performed on the candidate read request selected in the selection step S10.

Figure 10:
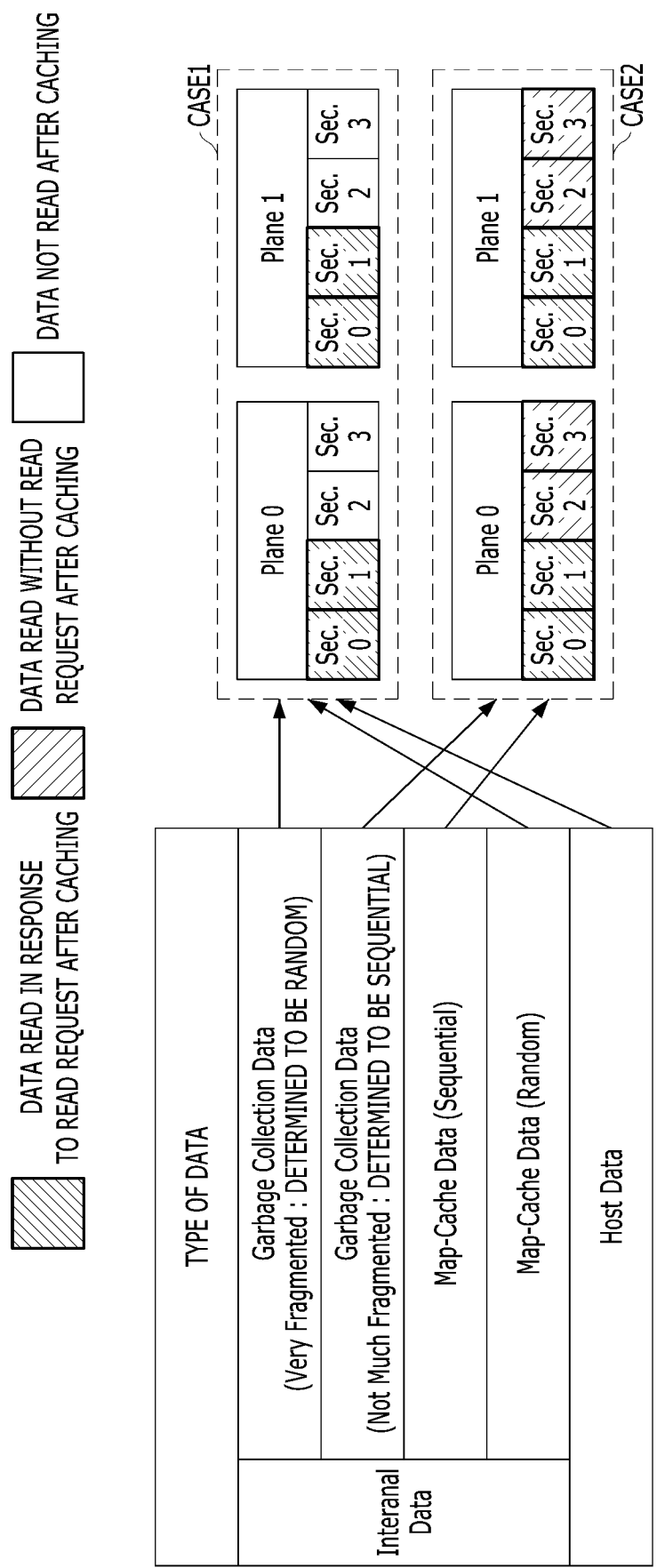
FIG. 10 illustrates an operation of the controller depending on the type of data.

FIG. 10 illustrates a first operation of the controller depending on the type of data.

FIG. 10 is a diagram illustrating that the read mode selection circuitry 199 selects a read mode CASE1 or CASE2 of the operation control circuitry 196 based on the type of data corresponding to a read request received from the correlation circuitry 194.

Specifically, the type of data corresponding to the read request received from the correlation circuitry 194 may include internal data generated through an internal operation of the controller 130 (Internal Data) and host data received from the host 102 (Host Data).

In this case, if the read request corresponds to Host Data, the read mode selection circuitry 199 may control the operation control circuitry 196 to select the first read mode CASE1. Furthermore, if Internal Data is sequential, the read mode selection circuitry 199 may control the operation control circuitry 196 to select the second read mode CASE2. Furthermore, if Internal Data is random, the read mode selection circuitry 199 may control the operation control circuitry 196 to select the first read mode CASE1.

In this case, if Internal Data is sequential, this may mean that sequential map data (Map-Cache Data (Sequential)) is generated and managed within the controller 130. Furthermore, if Internal Data is sequential, this may mean that not much fragmented data is moved through a garbage collection operation within the controller 130.

In contrast, if Internal Data is random, this may mean that non-sequential random map data (Map-Cache Data (Random)) is generated and managed within the controller 130. Furthermore, if Internal Data is random, this may mean that very fragmented data is moved through a garbage collection operation within the controller 130.

For reference, an operation for the controller 130 to determine a characteristic of Internal Data may be defined in advance and applied by the controller 130 when data is generated.

In the first read mode CASE1, the operation control circuitry 196 may select and read only target data corresponding to a read request. For example, as illustrated in FIG. 10, if data stored in two sections Sec.0 and Sec.1 of four sections Sec.0, Sec.1, Sec.2, and Sec.3 included in one page is target data corresponding to a read request, the first read mode CASE1 may be an operation of selecting and reading only target data stored in the two sections Sec.0 and Sec.1. In this case, in the first read mode CASE1, the data stored in the two sections Sec.0 and Sec.1 of the four sections Sec.0, Sec.1, Sec.2, and Sec.3 included in the page may be cached in the page buffer and then read as the target data in response to the read request. In contrast, data stored in the remaining two sections Sec.2 and Sec.3 may be cached in the page buffer and not be read because a read request therefor is not present.

In the second read mode CASE2, the operation control circuitry 196 may select and read target data corresponding to a read request and additional data together. For example, as illustrated in FIG. 10, if data stored in two sections Sec.0 and Sec.1 of the four sections Sec.0, Sec.1, Sec.2, and Sec.3 included in one page is target data corresponding to a read request, the second read mode CASE2 may be an operation of reading target data stored in the two sections Sec.0 and Sec.1 and additional data stored in the remaining sections Sec.2 and Sec.3 together. In this case, in the second read mode CASE2, the data stored in the two sections Sec.0 and Sec.1 of the four sections Sec.0, Sec.1, Sec.2, and Sec.3 included in the page may be cached in the page buffer and then read as the target data in response to the read request. In contrast, the data stored in the remaining two sections Sec.2 and Sec.3 may be cached in the page buffer and then read as the additional data although a read request therefor is not present.

Figure 11A:
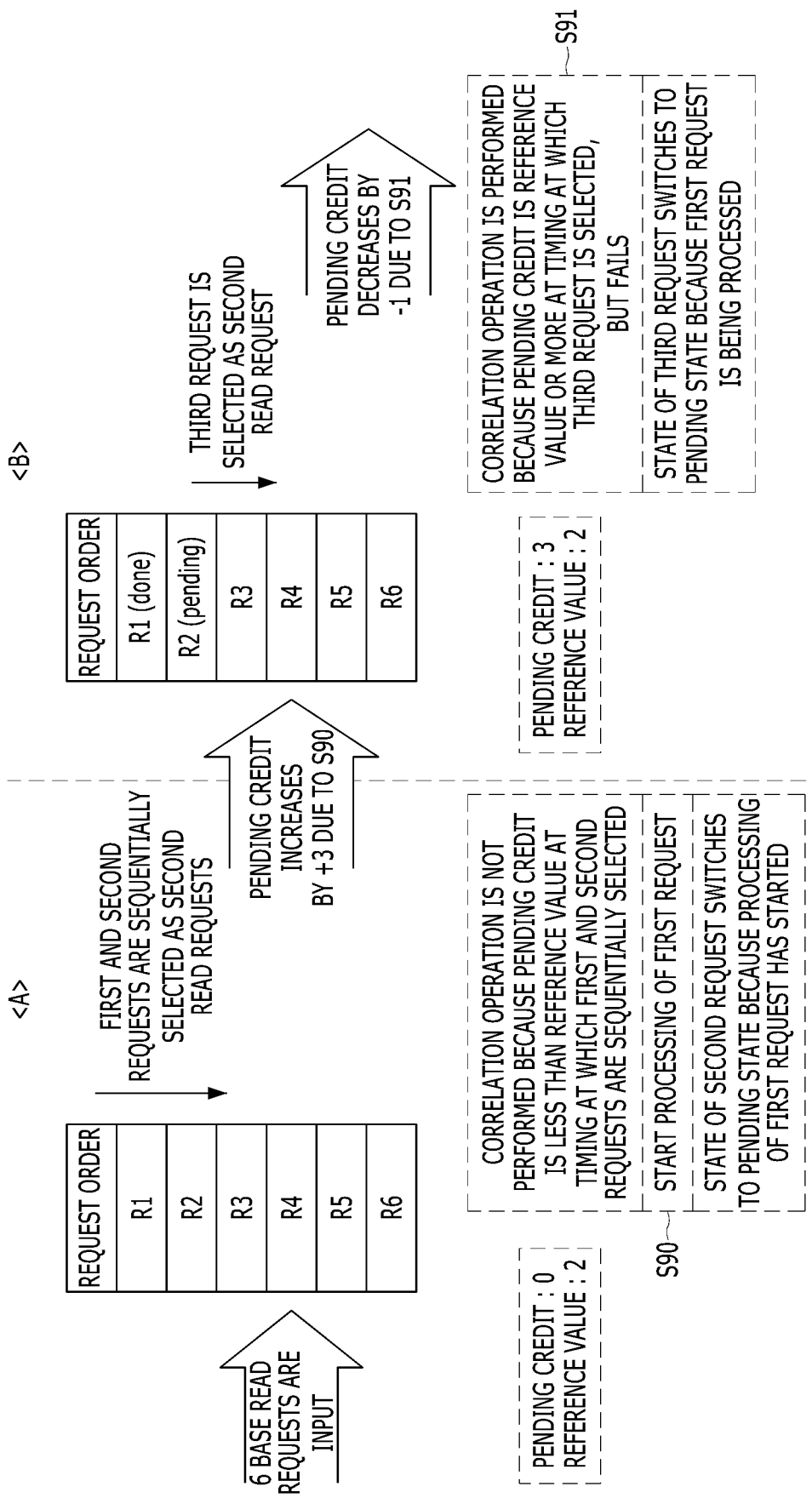
FIGS. 11A to 11C illustrate an operation of the controller for multiple read requests.
Figure 11B:
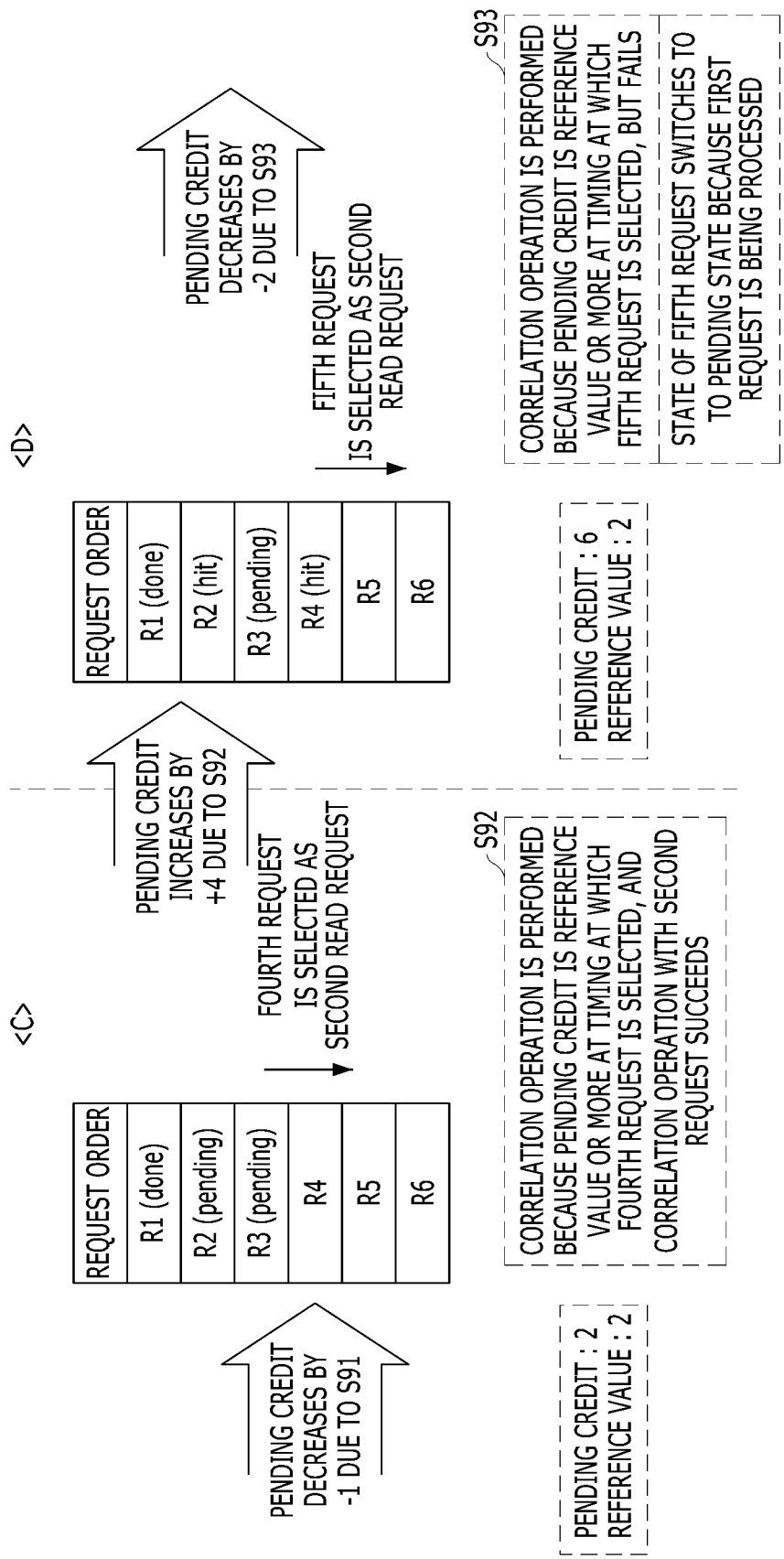
Figure 11C:
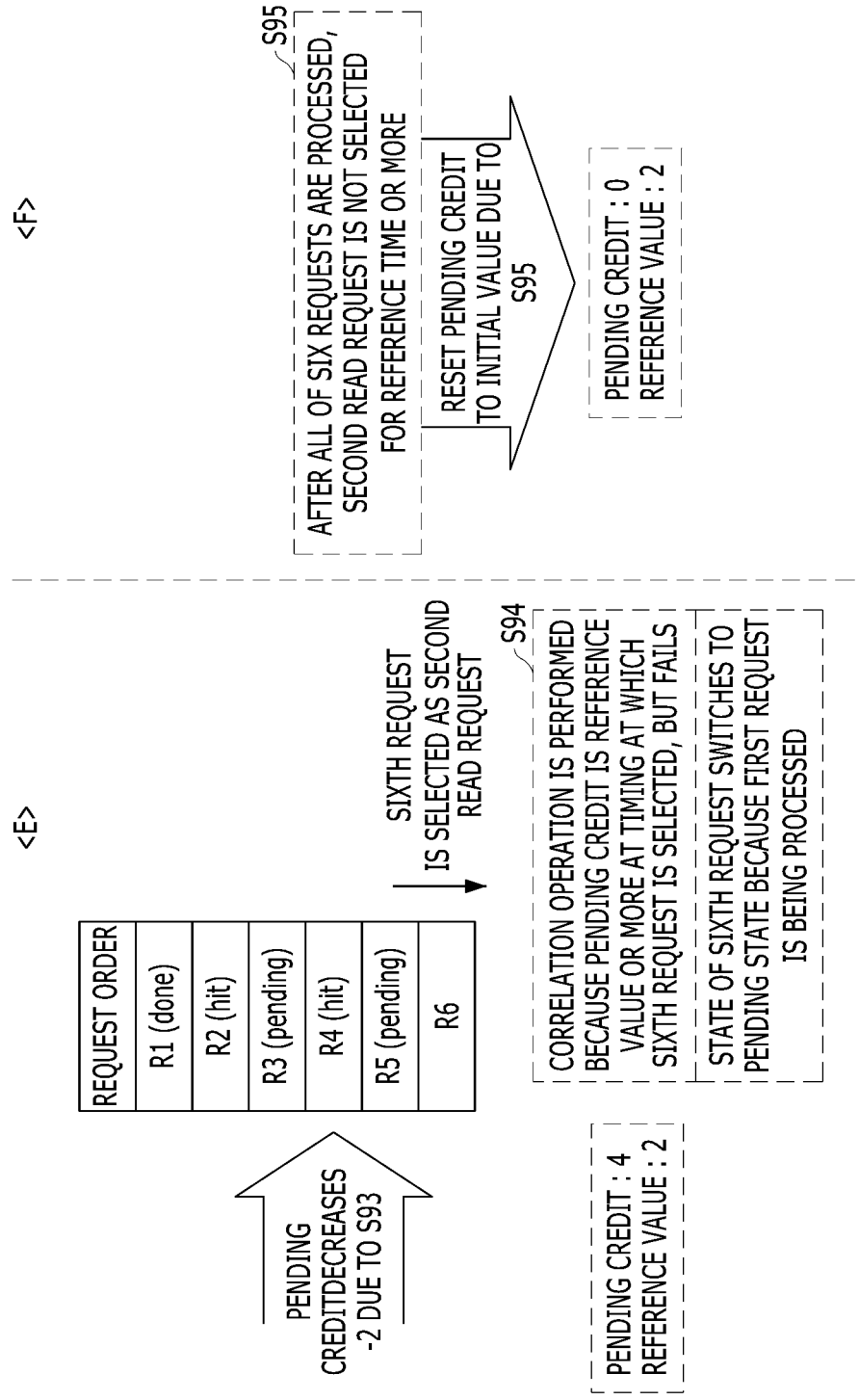

FIGS. 11A to 11C illustrate a first operation of the controller 130 for multiple read requests. Specifically, the first operation may be performed by the pending credit determining circuitry 195 and the correlation circuitry 194 described with reference to FIG. 6. Furthermore, a plurality of read requests described in the first operation may be read requests received from the host or read requests internally generated by the controller. Furthermore, data corresponding to the plurality of read requests described in the first operation may be data that is read-requested through an internal operation of the controller or random data that is read-requested by the host.

Specifically, referring to FIGS. 11A to 11C, it is assumed that a plurality of base read requests received from the host 102 (refer to FIGS. 2 and 3) or generated within the controller 130 has been input and stored in the input buffer 186. The plurality of base read requests stored in the input buffer 184 may be arranged in input order from the host. It is assumed that the plurality of base read requests includes six read requests R1 to R6.

The read requests R1 to R6 received from the host 102 or generated within the controller 130 have a structure, such as the same code, according to an agreed protocol, but a sequence of 1 to 6 has been incorporated and illustrated in FIGS. 11A to 11C, for convenience of description.

A read request of the read requests R1 to R6 that is transmitted to the host 102 may be transmitted along with a logical address (not illustrated). In such a case, the correlation circuitry 194 may identify to which memory die a corresponding read request needs to be transmitted using logical addresses, received along with the base read requests R1 to R6, with reference to the map memory 182 (refer to FIG. 6).

Referring to <A> of FIG. 11A, it may be seen that the first and second of the six base read requests R1 to R6 stored in the input buffer 186 are selected as candidate read requests. Furthermore, it may be seen that a pending credit has been reset to 0.

A correlation may not be performed on the first base read request R1 because it is the only candidate read request present when R1 is selected as a candidate read request.

Next, while it is possible that the second base read request R2 becomes a target of a correlation operation because two candidate read requests R1 and R2 are present when the second base read request R2 is selected as a candidate read request, such correlation operation may not be performed because the pending credit is 0, which is less than 2, that is, a reference value.

Thereafter, the first candidate read request R1 is transmitted to any one of the multiple memory dies and processed (S90) without having been subjected to a correlation operation. At this time, the second candidate read request R2 may be in a pending state because the first candidate read request R1 is being processed.

The pending credit determining circuitry 195 may increase the pending credit by 3 in response to the processing of the first candidate read request R1 without a correlation operation (S90) as described above. In this case, the time at which the pending credit determining circuitry 195 increases the pending credit may be the time at which the third base read request R3 is selected as a candidate read request. That is, when the third base read request R3 is selected as a candidate read request in <B> of FIG. 11A, the pending credit determining circuitry 195 may increase the pending credit as a result of the first candidate read request R1 having been processed without a correlation operation (S90) in <A> of FIG. 11A. While the presently described scenario entail an increase in the pending credit when the process proceeds from <A> of FIG. 11A to <B> of FIG. 11A, in a different scenario the pending credit may decrease.

Referring to <B> of FIG. 11A, it may be seen that the third base read request R3 of the six base read requests R1 to R6 stored in the input buffer 186 is selected as a candidate read request. Furthermore, a pending credit is 3.

At the time at which the third base read request R3 is selected as the candidate read request, a correlation operation may be performed because the second candidate read request R2 is pending and the pending credit is more than the reference value. That is, a correlation operation may be performed on the third candidate read request R3.

Accordingly, the correlation circuitry 194 may determine whether a memory die corresponding to the third candidate read request R3 and a memory die corresponding to the second candidate read request R2 are correlated. In this scenario, as a result of the correlation operation, the memory die corresponding to the third candidate read request R3 and the memory die corresponding to the second candidate read request R2 cannot be correlated, that is, the correlation operation fails (S91). At this time, the second and third candidate read requests R2 and R3 may be in a pending state because the first candidate read request R1 is being processed (or has been processed).

The pending credit determining circuitry 195 may decrease the pending credit by 1 in response to the failure of the correlation operation on the third candidate read request R3. In this case, the time at which the pending credit determining circuitry 195 decreases the pending credit may be the time at which the fourth base read request R4 is selected as a candidate read request. That is, when the fourth base read request R4 is selected as the candidate read request in <C> of FIG. 11B, the pending credit determining circuitry 195 may decrease the pending credit as a result of the correlation operation on the third candidate read request R3 having failed (S91) in <B> of FIG. 11A.

Referring to <C> of FIG. 11B, it may be seen that the fourth base read request R4 of the six base read requests R1 to R6 stored in the input buffer 186 is selected as a candidate read request. Furthermore, a pending credit is 2.

At the time at which the fourth base read request R4 is selected as the candidate read request, a correlation operation may be performed because the second and third candidate read requests R2 and R3 are pending and the pending credit is the reference value or more. That is, a correlation operation may be performed on the fourth candidate read request R4.

Accordingly, the correlation circuitry 194 may determine whether a memory die corresponding to the fourth candidate read request R4 may be correlated with the memory die corresponding to the second candidate read request R2 or the memory die corresponding to the third candidate read request R3. Here, as a result of the correlation operation, the memory die corresponding to the fourth candidate read request R4 and the memory die corresponding to the second candidate read request R2 can be correlated, that is, the correlation operation is successful (S92).

The pending credit determining circuitry 195 may increase the pending credit by 4 in response to the success of the correlation operation on the fourth candidate read request R4. In this case, the time at which the pending credit determining circuitry 195 increases the pending credit may be the time at which the fifth base read request R5 is selected as the candidate read request. That is, when the fifth base read request R5 is selected as the candidate read request in <D> of FIG. 11B, the pending credit determining circuitry 195 may increase the pending credit as a result of the correlation operation on the fourth candidate read request R4 having been successful (S92) in <C> of FIG. 11B.

Referring to <D> of FIG. 11B, it may be seen that the fifth base read request R5 of the six base read requests R1 to R6 stored in the input buffer 186 is selected as a candidate read request. Furthermore, a pending credit is 6.

At the time at which the fifth base read request R5 is selected as the candidate read request, a correlation operation may be performed because the third candidate read request R3 is pending and the pending credit is more than the reference value. That is, the correlation operation may be performed on the fifth candidate read request R5. At this time, the second candidate read request R2 and the fourth candidate read request R4 cannot be selected as read information for the correlation operation of the fifth base read request R5 because they have already been correlated.

Accordingly, the correlation circuitry 194 may determine whether a memory die corresponding to the fifth candidate read request R5 and the memory die corresponding to the third candidate read request R3 may be correlated. In this scenario, as a result of the correlation operation, the memory die corresponding to the fifth candidate read request R5 and the memory die corresponding to the third candidate read request R3 cannot be correlated, that is, the correlation operation fails (S93). At this time, the third and fifth candidate read requests R3 and R5 may be in a pending state because the first candidate read request R1 is being processed (or has been processed).

The pending credit determining circuitry 195 may decrease the pending credit by 2 in response to the failure of the correlation operation on the fifth candidate read request R5. In this case, the time at which the pending credit determining circuitry 195 decreases the pending credit may be the time at which the sixth base read request R6 is selected as a candidate read request. That is, when the sixth base read request R6 is selected as the candidate read request in <E> of FIG. 11C, the pending credit determining circuitry 195 may decrease the pending credit as a result of the correlation operation on the fifth candidate read request R5 having failed (S93) in <D> of FIG. 11B.

For reference, it may be seen that the pending credit is decreased by 1 in response to the failure of the correlation operation on the third candidate read request R3 in <B> of FIG. 11A, and the pending credit is decreased by 2 in response to the failure of the correlation operation on the fifth candidate read request R5 in <D> of FIG. 11B. That is, it may be seen that in both cases, the pending credit determining circuitry 195 decreases the pending credits in response to the respective failures of the correlation operations but by different amounts. The reason for this is that the time consumed due to the failure of the correlation operation on the third candidate read request R3 is shorter than the time consumed due to the failure of the correlation operation on the fifth candidate read request R5. Thus, the pending credit is decreased more as a result of the failure of the correlation operation on R5 than as a result of the failure of the correlation operation on R3.

Referring to <E> of FIG. 11C, it may be seen that the sixth base read request R6 of the six base read requests R1 to R6 stored in the input buffer 186 is selected as a candidate read request. Furthermore, it may be seen that a pending credit is 4.

At the time at which the sixth base read request R6 is selected as the candidate read request, a correlation operation may be performed because the third and fifth candidate read requests R3 and R5 are pending and the pending credit is more than the reference value. That is, the correlation operation may be performed on the sixth candidate read request R6.

Accordingly, the correlation circuitry 194 may determine whether a memory die corresponding to the sixth candidate read request R6 may be correlated with the memory die corresponding to the third candidate read request R3 or the memory die corresponding to the fifth candidate read request R5. Here, as a result of the correlation operation, the memory die corresponding to the sixth candidate read request R6 cannot be correlated with the memory die corresponding to the third candidate read request R3 or the memory die corresponding to the fifth candidate read request R5, that is, the correlation operation fails (S94).

The pending credit determining circuitry 195 may decrease the pending credit in response to the failure of the correlation operation on the sixth candidate read request R6 as described above. In this case, the pending credit determining circuitry 195 may decrease the pending credit when another base read request is additionally selected as a candidate read request within a reference time after the sixth base read request R6 is selected as the candidate read request.

However, referring to <F> of FIG. 11C, after the sixth base read request R6 is selected as the candidate read request, another base read request is not selected as a candidate read request for the reference time or more (S95). That is, after all of the six base read requests R1 to R6 stored in the input buffer 186 are selected as the candidate read requests and processed, another base read request is not received for the reference time or more or is received during that time but not selected as a candidate read request due to an operating state of the memory system 110.

Accordingly, the pending credit determining circuitry 195 may not decrease the pending credit in response to the failure of the correlation operation on the sixth candidate read request R6.

Furthermore, after the sixth base read request R6 is selected as the candidate read request, the pending credit may be reset to 0, that is, an initial value, in response to the non-selection of a candidate read request for the reference time or more (S95).

Although various embodiments have been illustrated and described, it will be apparent to those skilled in the art that various changes and modifications may be made without departing from the spirit and scope of the invention as defined in the following claims. The present invention encompasses all changes and modifications that fall within the scope of the claims.

What is claimed is:

1. A memory system comprising:
multiple memory dies configured to output data of different sizes in response to a read request; and
a controller in communication with the multiple memory dies through multiple channels, and configured to:
perform a correlation operation on the read request so that the multiple memory dies interleave and output target data corresponding to the read request through the multiple channels,
determine a pending credit using a result of the correlation operation, and
read, from the multiple memory dies, the target data corresponding to the read request and additional data stored in a same storage unit as the target data, based on a type of the target data corresponding to the read request and the pending credit.

2. The memory system of claim 1, wherein:
each of the multiple memory dies comprises multiple blocks each comprising multiple pages each comprising multiple sections each comprising multiple memory cells and a page buffer configured to cache data read from the multiple blocks, in page units, and
each of the multiple memory dies outputs data in section units or page units from the page buffer in response to the read request.

3. The memory system of claim 2,
wherein the controller determines the pending credit based on whether a previous correlation operation has been performed prior to selection timing, whether the previous correlation operation was successful, and operating states of the multiple memory dies at the selection timing,
wherein the selection timing indicates the time at which candidate read requests are selected as a target of the correlation operation among a plurality of base read requests.

4. The memory system of claim 3,
wherein if the candidate read request is a read request of a section unit, when processing the candidate read request, the controller reads, from the multiple memory dies, the target data corresponding to the candidate read request and the additional data stored in the same storage unit based on a type of the target data corresponding to the candidate read request and the pending credit at a processing timing, which is a time at which the candidate read request is processed, and
wherein the storage unit is a page.

5. The memory system of claim 4, wherein when the candidate read request is a read request of a section unit and the target data corresponding to the candidate read request is sequential data that is read-requested through an internal operation, the controller:
reads the target data corresponding to the candidate read request and the additional data together from the same page when the pending credit at the processing timing is a first reference value or more, and
reads only the target data corresponding to the candidate read request when the pending credit at the processing timing is less than the first reference value.

6. The memory system of claim 5, wherein when the candidate read request is a read request of a section unit and the target data corresponding to the candidate read request is random data that is read-requested through an internal operation or data that is read-requested by a host, the controller reads only the target data corresponding to the candidate read request.

7. The memory system of claim 4, wherein the controller is further configured to determine whether to perform the correlation operation on the candidate read request selected at the selection timing, based on a type of target data corresponding to the candidate read request selected at the selection timing and the pending credit at the selection timing.

8. The memory system of claim 7, wherein when the target data of the candidate read request selected at the selection timing is data that is read-requested through an internal operation or random data that is read-requested by a host, the controller performs the correlation operation on the candidate read request selected at the selection timing when the pending credit at the selection timing is the second reference value or more.

9. The memory system of claim 7, wherein the controller comprises:
an input buffer configured to temporarily store the base read request;
an output buffer configured to temporarily store data to be output to the host;
input/output (I/O) buffer control circuitry configured to select the candidate read request by monitoring states of the input buffer and the output buffer;
monitoring circuitry configured to monitor operating states of the multiple memory dies;
correlation circuitry configured to determine whether to perform the correlation operation on the candidate read request selected at the selection timing, based on the type of target data corresponding to the candidate read request selected at the selection timing and the pending credit at the selection timing, and output a correlated read request before a non-correlated read request;
pending credit determining circuitry configured to determine the pending credit in response to operations of the I/O buffer control circuitry, the monitoring circuitry and the correlation circuitry;
read mode selection circuitry configured to select a read mode based on a type of target data corresponding to the outputted read request and the pending credit at a time of outputting the read request when the outputted read request is a read request of a section unit; and operation control circuitry configured to identify a target address for the outputted read request and transmit the target address to the multiple memory dies through the multiple channels by applying the selected read mode.

10. The memory system of claim 3, wherein the controller:
   decreases the pending credit when at least one of the multiple memory dies is in an idle state at the selection timing,
   increases the pending credit when a previous candidate read request is processed without the correlation operation prior to the selection timing,
   increases the pending credit when the previous correlation operation succeeded and decreases the pending credit when the previous correlation operation failed, and
   resets the pending credit to an initial value when the candidate read request is not selected for a reference time or more after the determining of whether to perform the correlation operation.

11. An operating method of a memory system comprising multiple memory dies capable of outputting data of different sizes in response to a read request, the operating method comprising:
   performing a correlation operation on the read request so that the multiple memory dies interleave and output target data corresponding to the read request through multiple channels,
   determining a pending credit using a result of the correlation operation; and
   reading, from the multiple memory dies, target data corresponding to the read request and additional data stored in a same storage unit as the target data, based on a type of the target data corresponding to the read request and the pending credit.

12. The operating method of claim 11, wherein:
   each of the multiple memory dies comprises multiple blocks each comprising multiple pages each comprising multiple sections each comprising multiple memory cells and a page buffer configured to cache data read from the memory cells in page units, and
   each of the multiple memory dies outputs the read data in section units or page units from the page buffer in response to the read request.

13. The operating method of claim 12,
   wherein in the determining, the pending credit is determined based on whether a previous correlation operation has been performed prior to selection timing, whether the previous correlation operation was successful, and operating states of the multiple memory dies at the selection timing,
   wherein the selection timing indicates the time at which candidate read requests are selected as a target of the correlation operation among a plurality of base read requests.

14. The operating method of claim 13,
   wherein in the reading, when the candidate read request is a read request of a section unit, when the candidate read request is processed, the target data corresponding to the candidate read request and the additional data stored in the same storage unit are read together from the multiple memory dies based on a type of the target data corresponding to the candidate read request and the pending credit at a processing timing, which is a time at which the candidate read request is processed, and wherein the storage unit is a page.

15. The operating method of claim 14, wherein the reading comprises:
   reading the target data corresponding to the candidate read request and the additional data together from the same page when the pending credit at the processing timing is a first reference value or more when the candidate read request is a read request of a section unit and the target data corresponding to the candidate read request is sequential data that is read-requested through an internal operation;
   reading only the target data corresponding to the candidate read request when the pending credit at the processing timing is less than the first reference value when the candidate read request is a read request of a section unit and the target data corresponding to the candidate read request is sequential data that is read-requested through an internal operation; and
   reading only the target data corresponding to the candidate read request when the candidate read request is a read request of a section unit and the target data corresponding to the candidate read request is random data that is read-requested through an internal operation or data that is read-requested by a host.

16. The operating method of claim 15, further comprising:
   identifying, in a first transmission operation, a target address for a read request correlated due to a success of the correlation operation and transmitting the target address to the multiple memory dies through the multiple channels;
   receiving, in a first receiving operation, data corresponding to the correlated read request in an interleaving manner through the multiple channels after the first transmission operation;
   identifying, in a second transmission operation, a target address for a read request not correlated due to a failure of the correlation operation and transmitting the target address to the multiple memory dies;
   receiving, in a second receiving operation, from the multiple memory dies, data corresponding to the not-correlated read request after the second transmission operation; and
   outputting, to an external apparatus, the data received in the first or second receiving operation.

17. The operating method of claim 14, further comprising determining whether to perform the correlation operation on the candidate read request selected at the selection timing, based on a type of data corresponding to the candidate read request selected at the selection timing and the pending credit at the selection timing.

18. The operating method of claim 17, wherein the performing of the correlation comprises: performing the correlation operation on the candidate read request selected at the selection timing when the target data of the candidate read request selected at the selection timing is data that is read-requested through an internal operation or random data that is read-requested by a host and when the pending credit at the selection timing is the second reference value or more.

19. The operating method of claim 13, wherein the determining comprises:
   decreasing the pending credit when at least one of the multiple memory dies is in an idle state at the selection timing;
   increasing the pending credit when a previous candidate read request is processed without the correlation operation prior to the selection timing;

increasing the pending credit when the previous correlation operation succeeded;

decreasing the pending credit when the previous correlation operation failed; and resetting the pending credit to an initial value when the candidate read request is not selected for a reference time or more after the determining of whether to perform the correlation operation.

\* \* \* \* \*